(12) United States Patent
Yamazaki et al.

(10) Patent No.: US 11,487,144 B2
(45) Date of Patent: Nov. 1, 2022

(54) INPUT/OUTPUT DEVICE AND DATA PROCESSING DEVICE

(71) Applicant: SEMICONDUCTOR ENERGY LABORATORY CO., LTD., Atsugi (JP)

(72) Inventors: Shunpei Yamazaki, Tokyo (JP); Koji Kusunoki, Kanagawa (JP); Tetsuji Ishitani, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 17/262,827

(22) PCT Filed: Jul. 30, 2019

(86) PCT No.: PCT/IB2019/056463
§ 371 (c)(1),
(2) Date: Jan. 25, 2021

(87) PCT Pub. No.: WO2020/031018
PCT Pub. Date: Feb. 13, 2020

(65) Prior Publication Data
US 2021/0294141 A1 Sep. 23, 2021

(30) Foreign Application Priority Data
Aug. 9, 2018 (JP) .............................. JP2018-150221

(51) Int. Cl.
*G02F 1/1333* (2006.01)
*G02F 1/137* (2006.01)
(Continued)

(52) U.S. Cl.
CPC ........ *G02F 1/13338* (2013.01); *G02F 1/1337* (2013.01); *G02F 1/13756* (2021.01);
(Continued)

(58) Field of Classification Search
CPC ............... G02F 1/13338; G02F 1/1337; G02F 1/134309; G02F 1/13756; G02F 1/13775;
(Continued)

(56) References Cited

U.S. PATENT DOCUMENTS 8,253,911 B2   8/2012 Kimura
8,767,159 B2   7/2014 Kimura
(Continued)

FOREIGN PATENT DOCUMENTS

CN   101241250 A    8/2008
JP   2008-197148 A   8/2008
(Continued)

OTHER PUBLICATIONS

International Search Report (Application No. PCT/IB2019/056463) dated Oct. 8, 2019.
(Continued)

*Primary Examiner* — Charles S Chang
(74) *Attorney, Agent, or Firm* — Fish & Richardson P.C.

(57) ABSTRACT

A novel input/output device that is highly convenient or reliable is provided. The input/output device includes a display portion and an input portion, and the display portion includes a liquid crystal element. The liquid crystal element includes a first electrode, a second electrode, a layer containing a liquid crystal material, a first alignment film, and a second alignment film, and the second electrode is provided such that an electric field is applied to the layer containing a liquid crystal material between the first electrode and the second electrode. The layer containing a liquid crystal material scatters incident light with first scattering intensity when the electric field is in a first state, the layer containing a liquid crystal material scatters the incident light with second scattering intensity when the electric field is in a second state, which is higher than that in the first state, and
(Continued)

the second scattering intensity is 10 or more times as high as the first scattering intensity. The layer containing a liquid crystal material contains a liquid crystal material and a polymer material, and the layer containing a liquid crystal material is stabilized by the polymer material. The input portion includes a sensing region, the input portion senses an object approaching the sensing region, the sensing region includes a region overlapping with a pixel, and the sensing region includes a sensor.

8 Claims, 16 Drawing Sheets

(51) Int. Cl.
*G02F 1/1337* (2006.01)
*G02F 1/1343* (2006.01)
*G06F 3/042* (2006.01)
*G09G 3/36* (2006.01)
*G06V 40/13* (2022.01)

(52) U.S. Cl.
CPC .... *G02F 1/13775* (2021.01); *G02F 1/134309* (2013.01); *G06F 3/042* (2013.01); *G06V 40/1318* (2022.01); *G09G 3/36* (2013.01); *G06F 2203/04101* (2013.01)

(58) Field of Classification Search
CPC .......... G06F 3/042; G06F 2203/04101; G06V 40/1318; G09G 3/36
USPC ........................................................ 349/12
See application file for complete search history.

(56) References Cited

U.S. PATENT DOCUMENTS

| | | | |
|---|---|---|---|
| 9,360,722 | B2 | 6/2016 | Kimura |
| 9,645,461 | B2 | 5/2017 | Kimura |
| 9,817,520 | B2 | 11/2017 | Ikeda et al. |
| 10,012,880 | B2 | 7/2018 | Kimura |
| 10,120,238 | B2 | 11/2018 | Yata et al. |
| 10,372,004 | B2 | 8/2019 | Yamazaki et al. |
| 10,429,694 | B2 | 10/2019 | Yata et al. |
| 10,649,295 | B2 | 5/2020 | Yamazaki et al. |
| 2008/0192237 | A1 | 8/2008 | Yamamoto |
| 2008/0284929 | A1 | 11/2008 | Kimura |
| 2011/0279427 | A1 | 11/2011 | Umezaki et al. |
| 2014/0340363 | A1 | 11/2014 | Ikeda et al. |
| 2018/0024403 | A1 | 1/2018 | Yata et al. |
| 2018/0196322 | A1 | 7/2018 | Yamazaki et al. |
| 2018/0364531 | A1 | 12/2018 | Kimura |
| 2020/0218123 | A1 | 7/2020 | Yamazaki et al. |
| 2021/0098300 | A1* | 4/2021 | Kusunoki ........... H01L 27/0688 |
| 2021/0341767 | A1* | 11/2021 | Wang .................... G02F 1/0072 |

FOREIGN PATENT DOCUMENTS

| | | |
|---|---|---|
| JP | 2008-287115 A | 11/2008 |
| JP | 2011-257746 A | 12/2011 |
| JP | 2015-005280 A | 1/2015 |
| JP | 2018-013714 A | 1/2018 |
| JP | 2018-120213 A | 8/2018 |
| KR | 2008-0074763 A | 8/2008 |
| KR | 2011-0126039 A | 11/2011 |
| WO | WO-2018/130899 | 7/2018 |

OTHER PUBLICATIONS

Written Opinion (Application No. PCT/IB2019/056463) dated Oct. 8, 2019.

* cited by examiner

INPUT/OUTPUT DEVICE AND DATA PROCESSING DEVICE

CROSS REFERENCE TO RELATED APPLICATIONS

This application is a U.S. National Phase Application under 35 U.S.C. § 371 of International Application PCT/IB2019/056463, filed on Jul. 30, 2019, which is incorporated by reference and claims the benefit of a foreign priority application filed in Japan on Aug. 9, 2018, as Application No. 2018-150221.

TECHNICAL FIELD

One embodiment of the present invention relates to an input/output device, a data processing device, or a semiconductor device.

Note that one embodiment of the present invention is not limited to the above technical field. The technical field of one embodiment of the invention disclosed in this specification and the like relates to an object, a method, or a manufacturing method. One embodiment of the present invention relates to a process, a machine, manufacture, or a composition of matter. Thus, more specifically, examples of the technical field of one embodiment of the present invention disclosed in this specification include a semiconductor device, a display device, a light-emitting device, a power storage device, a memory device, a driving method thereof, and a manufacturing method thereof.

BACKGROUND ART

A display device is known which includes a first substrate having a light-transmitting property, a second substrate facing the first substrate and having a light-transmitting property, an optical modulation layer provided between the first substrate and the second substrate, a light source unit that illuminates the optical modulation layer from the outside of a position opposite to, in the normal direction, a display region on which an image is displayed, first to third color filters of different colors of red, green, and blue, which are provided over the first substrate, and first to third electrodes facing the respective first to third color filters, and the optical modulation layer can modulate light-scattering properties of regions facing the corresponding first to third color filters depending on electric fields generated by the respective first to third electrodes (Patent Document 1).

REFERENCE

Patent Document

[Patent Document 1] United States Patent Application Publication No. 2018/0024403

SUMMARY OF THE INVENTION

Problems to be Solved by the Invention

An object of one embodiment of the present invention is to provide a novel input/output device that is highly convenient or reliable. Another object is to provide a novel data processing device that is highly convenient or reliable. Another object is to provide a novel input/output device, a novel data processing device, or a novel semiconductor device.

Note that the description of these objects does not preclude the existence of other objects. One embodiment of the present invention does not have to achieve all these objects. Other objects are apparent from the description of the specification, the drawings, the claims, and the like, and other objects can be derived from the description of the specification, the drawings, the claims, and the like.

Means for Solving the Problems (1) One embodiment of the present invention is an input/output device including a display portion and an input portion.

The display portion includes a display region, the display region includes a pixel, and the pixel includes a pixel circuit and a liquid crystal element.

The liquid crystal element includes a first electrode, a second electrode, a layer containing a liquid crystal material, a first alignment film, and a second alignment film. The first alignment film includes a region positioned between the first electrode and the layer containing a liquid crystal material, and the second alignment film includes a region positioned between the second electrode and the layer containing a liquid crystal material. The second electrode is provided such that an electric field is applied to the layer containing a liquid crystal material between the first electrode and the second electrode.

The layer containing a liquid crystal material scatters incident light with first scattering intensity when the electric field is in a first state, and the layer containing a liquid crystal material scatters the incident light with second scattering intensity when the electric field is in a second state, which is higher than that in the first state. Note that the second scattering intensity is 10 or more times as high as the first scattering intensity.

The layer containing a liquid crystal material contains a liquid crystal material and a polymer material, the layer containing a liquid crystal material is stabilized by the polymer material, and the polymer material is a copolymer of a polyfunctional monomer and a monofunctional monomer.

The input portion includes a sensing region, the input portion senses an object approaching the sensing region, the sensing region includes a region overlapping with the pixel, and the sensing region includes a sensor.

Accordingly, a finger or the like that approaches the display region on which an image is displayed can be sensed. Alternatively, data can be input by putting a finger or the like close to the display region on which an image is displayed. As a result, a novel input/output device that is highly convenient or reliable can be provided.

(2) One embodiment of the present invention is the above input/output device in which the sensor includes a photoelectric conversion element and the photoelectric conversion element senses light entering through the pixel.

Accordingly, an image of a finger, a fingerprint, a palm, a palm print, or the like that approaches the sensing region can be captured. Alternatively, an image of the appearance, finger, face, or the like of a user can be captured. Alternatively, an image can be captured while being displayed on the display region. Alternatively, user authentication can be performed while an image is displayed on the display region. As a result, a novel input/output device that is highly convenient or reliable can be provided.

(3) One embodiment of the present invention is the above input/output device in which the pixel circuit is electrically connected to the liquid crystal element.

The pixel circuit includes a first switch, a second switch, a first capacitor, a second capacitor, a node, and a conductive film.

The first switch includes a first terminal supplied with a first signal, and the first switch includes a second terminal electrically connected to the node.

The first capacitor includes a first electrode electrically connected to the node, and the first capacitor includes a second electrode electrically connected to the conductive film.

The second switch includes a first terminal supplied with a second signal, and the second switch includes a second terminal electrically connected to a first electrode of the second capacitor.

The second capacitor includes a second electrode electrically connected to the node.

Accordingly, a high voltage can be supplied to the liquid crystal element. Alternatively, a high electric field can be applied to the layer containing a liquid crystal material. Alternatively, the alignment of polymer-stabilized liquid crystal materials can be controlled. As a result, a novel input/output device that is highly convenient or reliable can be provided.

(4) One embodiment of the present invention is the above input/output device in which the display region includes a group of pixels, a different group of pixels, a first scan line, and a first signal line.

The group of pixels are arranged in a row direction, and the group of pixels include the pixel.

The different group of pixels are arranged in a column direction intersecting the row direction, and the different group of pixels include the pixel.

The first scan line is electrically connected to the group of pixels, and a second scan line is electrically connected to the group of pixels.

The first signal line is electrically connected to the different group of pixels, and a second signal line is electrically connected to the different group of pixels.

Thus, image data can be supplied to a plurality of pixels. Alternatively, the image data can be displayed. As a result, a novel input/output device that is highly convenient or reliable can be provided.

(5) One embodiment of the present invention is the input/output device in which the display portion includes a display panel and a control portion.

The control portion is supplied with image data and control data, the control portion generates data on the basis of the image data, the control portion generates a control signal on the basis of the control data, and the control portion supplies the data and the control signal.

The display panel includes the display region and a driver circuit, and the display panel is supplied with the data and the control signal.

The driver circuit operates on the basis of the control signal. The pixel performs display on the basis of the data.

Thus, the image data can be displayed using the liquid crystal element. As a result, a novel input/output device that is highly convenient or reliable can be provided.

(6) One embodiment of the present invention is a data processing device including the input/output device described in any one of the above embodiments and an arithmetic device.

The input/output device supplies sensing data and input data, and the input/output device includes a sensing portion. Note that the sensing portion generates the sensing data, and the input portion generates the input data.

The arithmetic device is supplied with the input data or the sensing data, and the arithmetic device generates the control data and the image data on the basis of the input data or the sensing data. The arithmetic device supplies the control data and the image data.

Thus, the control data can be generated on the basis of the input data or the sensing data. Alternatively, the image data can be displayed on the basis of the input data or the sensing data. As a result, a novel data processing device that is highly convenient or reliable can be provided.

(7) One embodiment of the present invention is the data processing device in which the arithmetic device includes an artificial intelligence portion.

The artificial intelligence portion is supplied with the input data or the sensing data, and the artificial intelligence portion infers the control data on the basis of the input data or the sensing data.

In this manner, the control data for display that can be felt suitable can be generated. Alternatively, display that can be felt suitable is possible. Alternatively, the control data for display that can be felt comfortable can be generated. Alternatively, display that can be felt comfortable is possible. As a result, a novel data processing device that is highly convenient or reliable can be provided.

(8) One embodiment of the present invention is a data processing device including one or more of a keyboard, a hardware button, a pointing device, a touch sensor, an illuminance sensor, an imaging device, an audio input device, an eye-gaze input device, and an attitude detection device, and the above input/output device.

Thus, an arithmetic device can generate image data or control data on the basis of data supplied using a variety of input devices. As a result, a novel data processing device that is highly convenient or reliable can be provided.

Although the block diagram in which components are classified according to their functions and shown as independent blocks is shown in the drawings attached to this specification, it is difficult to completely separate actual components according to their functions and one component can relate to a plurality of functions.

In this specification, the names of a source and a drain of a transistor interchange with each other depending on the polarity of the transistor and the levels of potentials applied to the terminals. In general, in an n-channel transistor, a terminal to which a lower potential is applied is called a source, and a terminal to which a higher potential is applied is called a drain. In a p-channel transistor, a terminal to which a lower potential is applied is called a drain, and a terminal to which a higher potential is applied is called a source. In this specification, for the sake of convenience, the connection relation of a transistor is sometimes described assuming that the source and the drain are fixed; in reality, the names of the source and the drain interchange with each other according to the above relation of the potentials.

In this specification, a source of a transistor means a source region that is part of a semiconductor film functioning as an active layer or a source electrode connected to the above-described semiconductor film. Similarly, a drain of a transistor means a drain region that is part of the above-described semiconductor film or a drain electrode connected to the above-described semiconductor film. Moreover, a gate means a gate electrode.

In this specification, a state in which transistors are connected in series means, for example, a state in which only one of a source and a drain of a first transistor is connected to only one of a source and a drain of a second transistor. In addition, a state in which transistors are connected in parallel means a state in which one of a source and a drain of a first transistor is connected to one of a source and a drain of a second transistor and the other of the source and the drain of the first transistor is connected to the other of the source and the drain of the second transistor.

In this specification, connection means electrical connection and corresponds to a state in which a current, a voltage, or a potential can be supplied or transmitted. Accordingly, a state of being connected does not necessarily mean a state of being directly connected and also includes, in its category, a state of being indirectly connected through a circuit element such as a wiring, a resistor, a diode, or a transistor that allows a current, a voltage, or a potential to be supplied or transmitted.

In this specification, even when independent components are connected to each other in a circuit diagram, there is actually a case where one conductive film has functions of a plurality of components such as a case where part of a wiring functions as an electrode, for example. Connection in this specification also includes such a case where one conductive film has functions of a plurality of components, in its category.

Furthermore, in this specification, one of a first electrode and a second electrode of a transistor refers to a source electrode and the other refers to a drain electrode.

Effect of the Invention

According to one embodiment of the present invention, a novel input/output device that is highly convenient or reliable can be provided. Alternatively, a novel data processing device that is highly convenient or reliable can be provided. Alternatively, a novel input/output device, a novel data processing device, or a novel semiconductor device can be provided.

Note that the description of these effects does not preclude the existence of other effects. One embodiment of the present invention does not need to have all these effects. Other effects will be apparent from the description of the specification, the drawings, the claims, and the like, and other effects can be derived from the description of the specification, the drawings, the claims, and the like.

BRIEF DESCRIPTION OF THE DRAWINGS

FIG. 10A and FIG. 10B1 to FIG. 10B3 are diagrams illustrating structures of an input/output device of an embodiment.

MODE FOR CARRYING OUT THE INVENTION

An input/output device of one embodiment of the present invention includes a display portion and an input portion. The display portion includes a display region, the display region includes a pixel, and the pixel includes a pixel circuit and a liquid crystal element. The liquid crystal element includes a first electrode, a second electrode, a layer containing a liquid crystal material, a first alignment film, and a second alignment film, the first alignment film includes a region positioned between the first electrode and the layer containing a liquid crystal material, and the second alignment film includes a region positioned between the second electrode and the layer containing a liquid crystal material. The second electrode is provided such that an electric field is applied to the layer containing a liquid crystal material between the first electrode and the second electrode. The layer containing a liquid crystal material scatters incident light with first scattering intensity when the electric field is in a first state, the layer containing a liquid crystal material scatters the incident light with second scattering intensity when the electric field is in a second state, which is higher than that in the first state, and the second scattering intensity is 10 or more times as high as the first scattering intensity. The layer containing a liquid crystal material contains a liquid crystal material and a polymer material, the layer containing a liquid crystal material is stabilized by the polymer material, and the polymer material is a copolymer of a polyfunctional monomer and a monofunctional monomer. The input portion includes a sensing region, the input portion senses an object approaching the sensing region, the sensing region includes a region overlapping with the pixel, and the sensing region includes a sensor.

Accordingly, a finger or the like that approaches the display region on which an image is displayed can be sensed. Alternatively, data can be input by putting a finger or the like close to the display region on which an image is displayed. As a result, a novel input/output device that is highly convenient or reliable can be provided.

Embodiments are described in detail with reference to the drawings. Note that the present invention is not limited to the following description, and it will be readily appreciated by those skilled in the art that modes and details of the present invention can be modified in various ways without departing from the spirit and scope of the present invention. Thus, the present invention should not be construed as being limited to the description in the following embodiments. Note that in structures of the invention described below, the same portions or portions having similar functions are

Embodiment 1

In this embodiment, a structure of an input/output device of one embodiment of the present invention will be described with reference to FIG. 1 to FIG. 7.

Figure 1A:
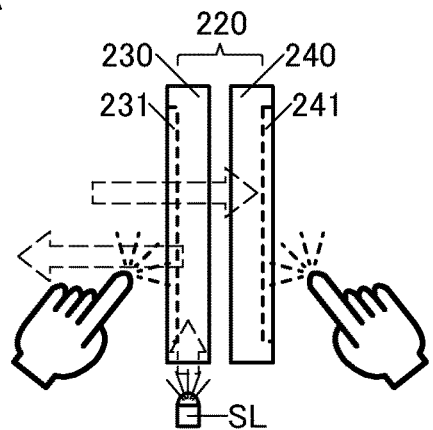
FIG. 1A to FIG. 1C are diagrams illustrating an input/output device of an embodiment.
Figure 1B:
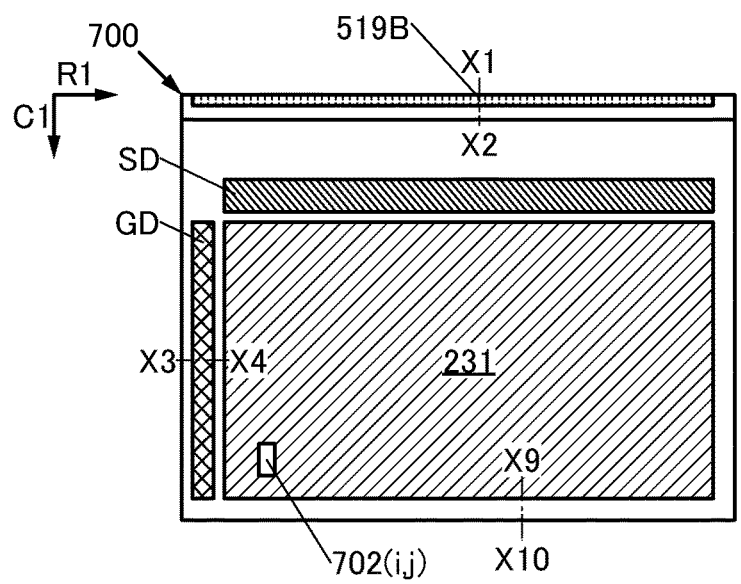
Figure 1C:
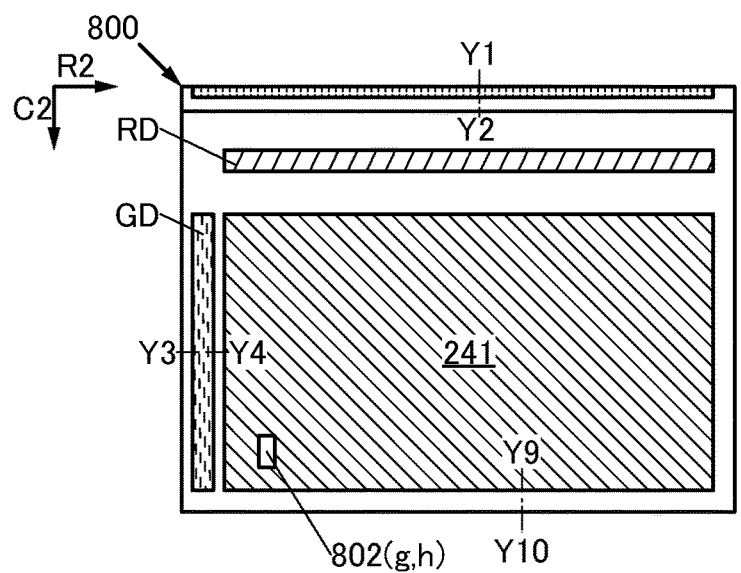

FIG. 1 is a diagram illustrating the structure of the input/output device of one embodiment of the present invention. FIG. 1A is a side view illustrating the structure of the input/output device of one embodiment of the present invention, FIG. 1B is a top view illustrating part of FIG. 1A, and FIG. 1C is a top view illustrating another part of FIG. 1A.

Figure 2A:
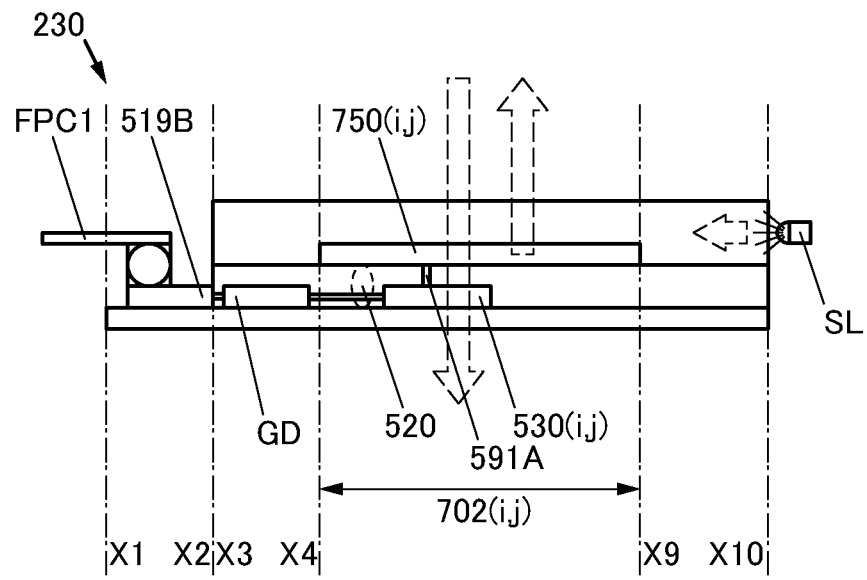
FIG. 2A and FIG. 2B are diagrams illustrating a structure of a display panel in an input/output device of an embodiment.
Figure 2B:
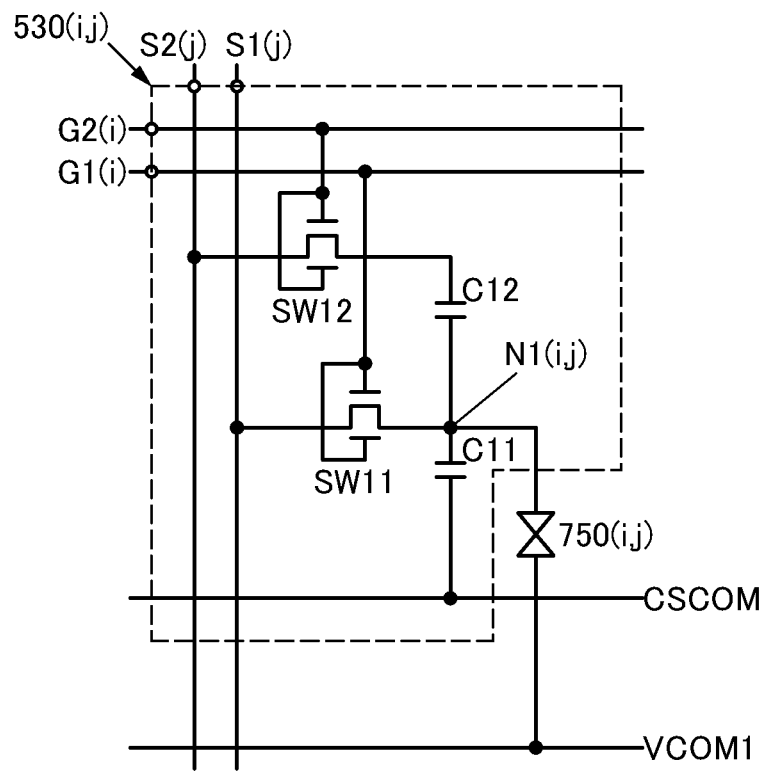

FIG. 2 is a diagram illustrating a structure of a display panel in the input/output device of one embodiment of the present invention. FIG. 2A is a cross-sectional view along cutting lines X1-X2, X3-X4, and X9-X10 and of a pixel in FIG. 1B, and FIG. 2B is a circuit diagram illustrating a structure of a pixel circuit $530(i,j)$.

Figure 3A:
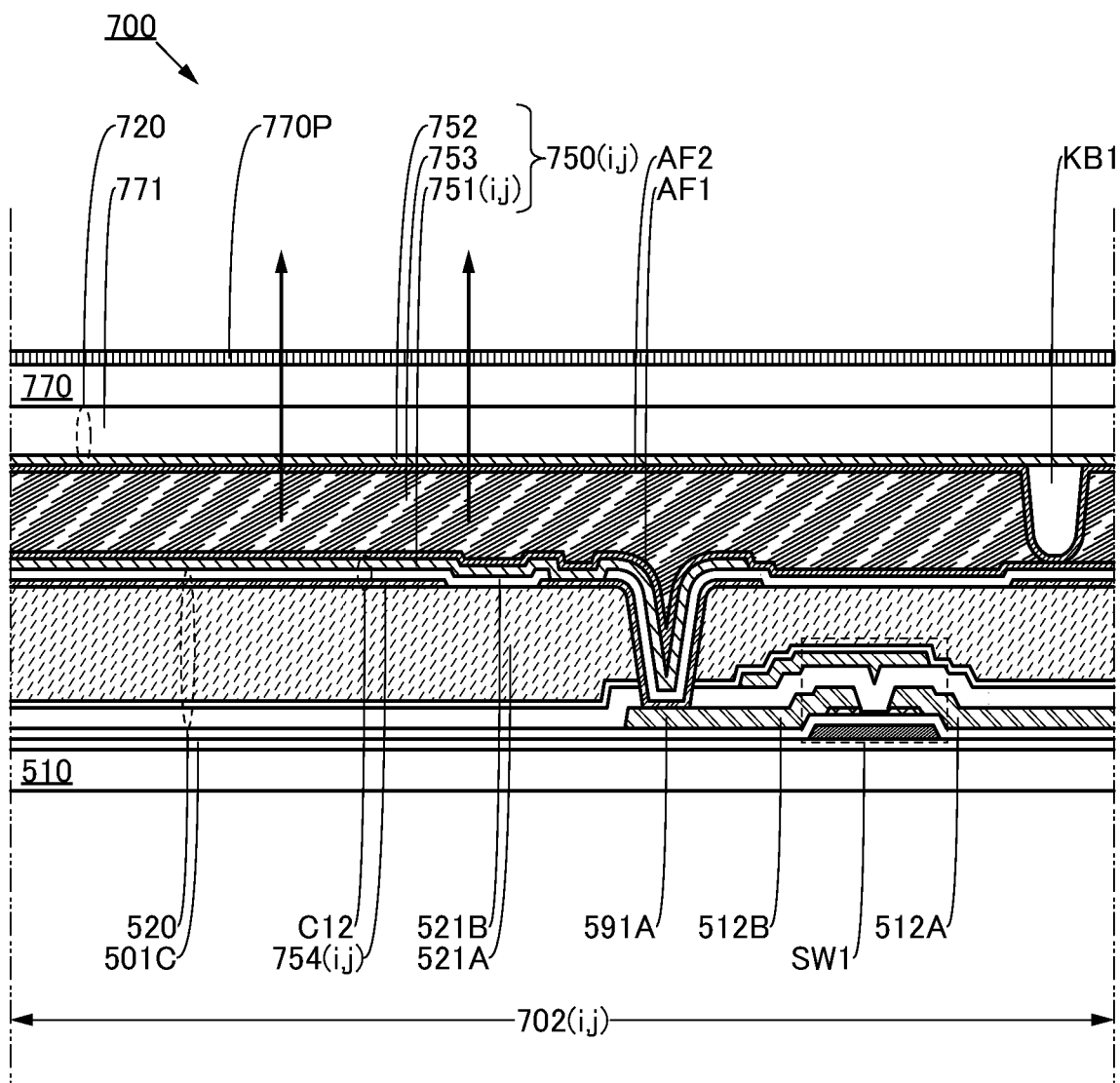
FIG. 3A and FIG. 3B are cross-sectional views illustrating a structure of a display panel in an input/output device of an embodiment.
Figure 3B:
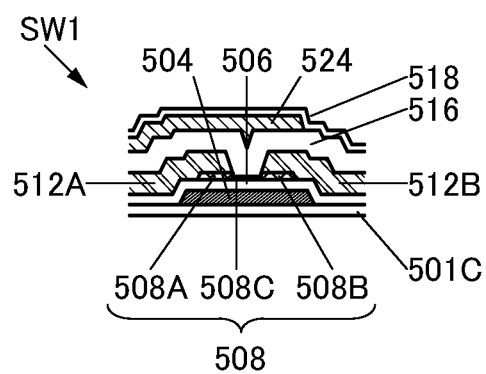

FIG. 3 is a diagram illustrating the structure of the display panel in the input/output device of one embodiment of the present invention. FIG. 3A is a cross-sectional view of a pixel $702(i, j)$ in FIG. 2A, and FIG. 3B is a cross-sectional view illustrating part of FIG. 3A.

Figure 4:
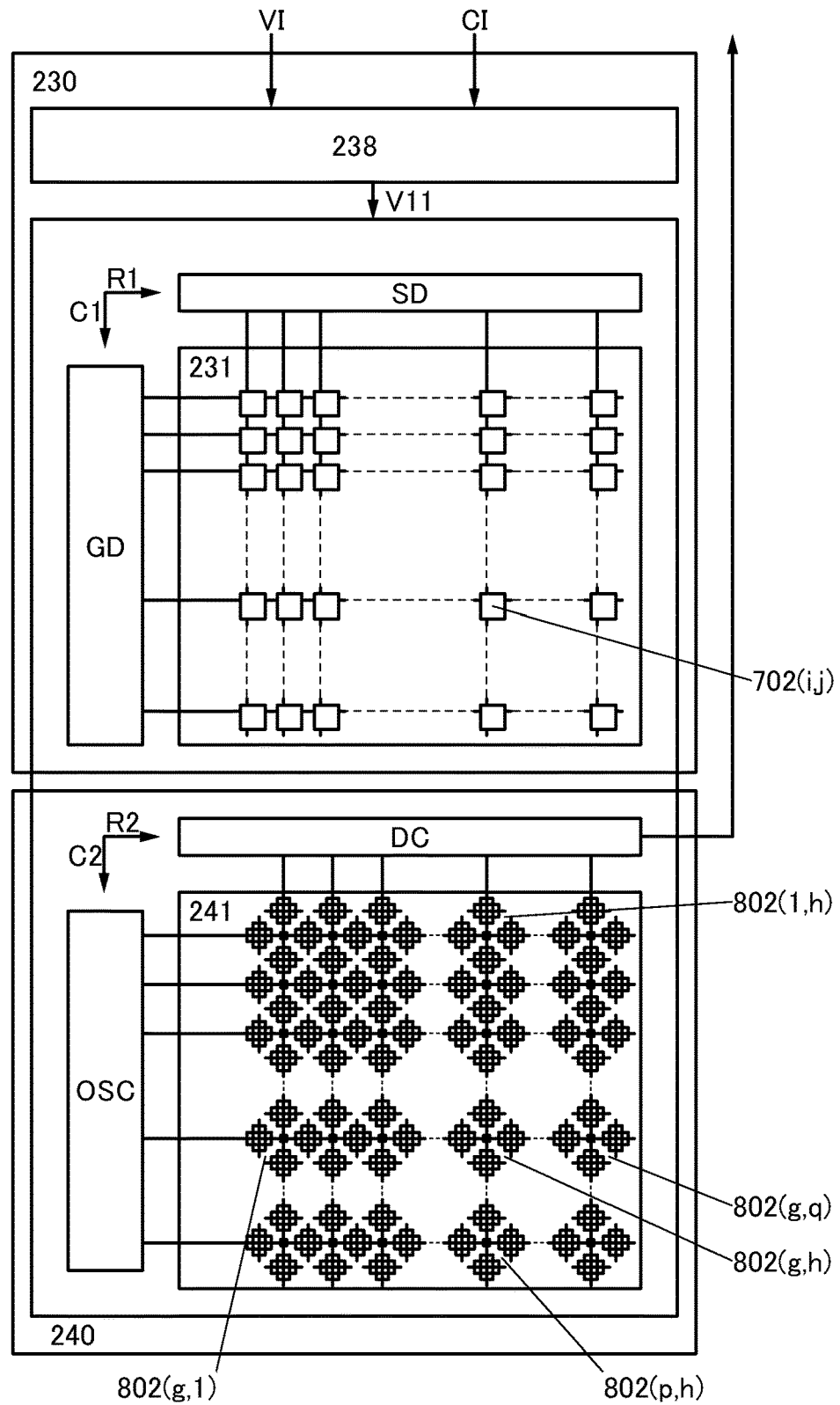
FIG. 4 is a block diagram illustrating a structure of an input/output device of an embodiment.

FIG. 4 is a block diagram illustrating the structure of the input/output device of one embodiment of the present invention.

Figure 5A:
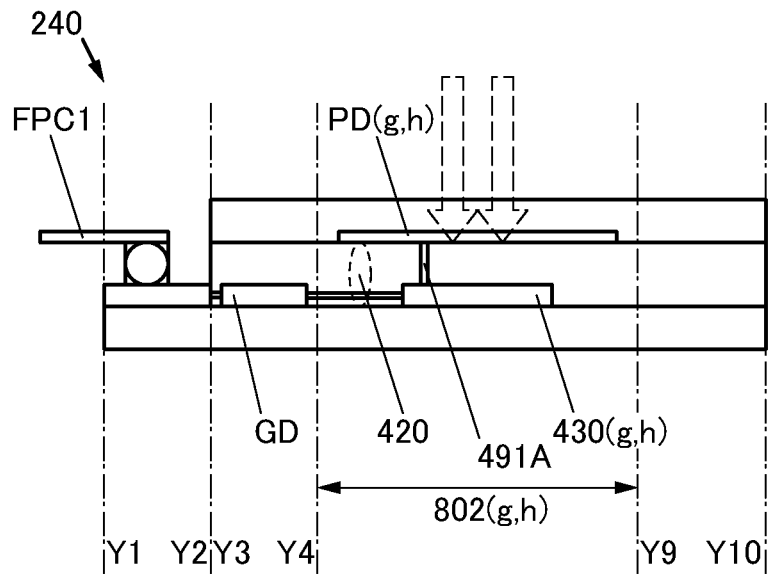
FIG. 5A and FIG. 5B are diagrams illustrating a structure of an input/output device of an embodiment.
Figure 5B:
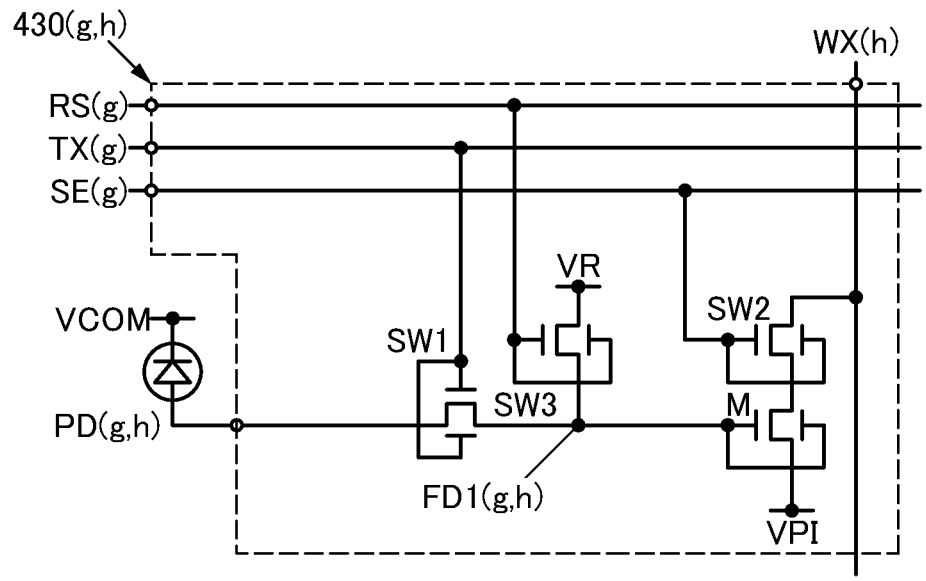

FIG. 5 is a diagram illustrating the structure of the input/output device of one embodiment of the present invention. FIG. 5A is a cross-sectional view along cutting lines Y1-Y2, Y3-Y4, and Y9-Y10 and of a pixel in FIG. 1C, and FIG. 5B is a circuit diagram illustrating a structure of a sensing circuit $430(g, h)$.

Figure 6:
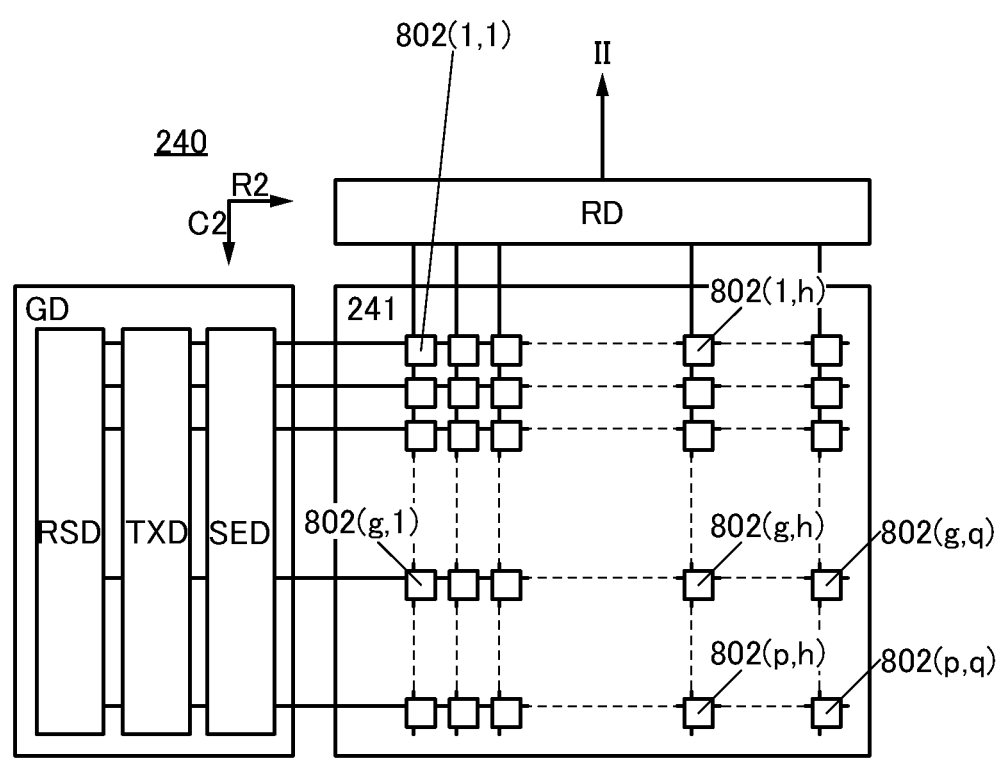
FIG. 6 is a block diagram illustrating a structure of an input/output device of an embodiment.

FIG. 6 is a block diagram illustrating the structure of the input/output device of one embodiment of the present invention.

Figure 7A:
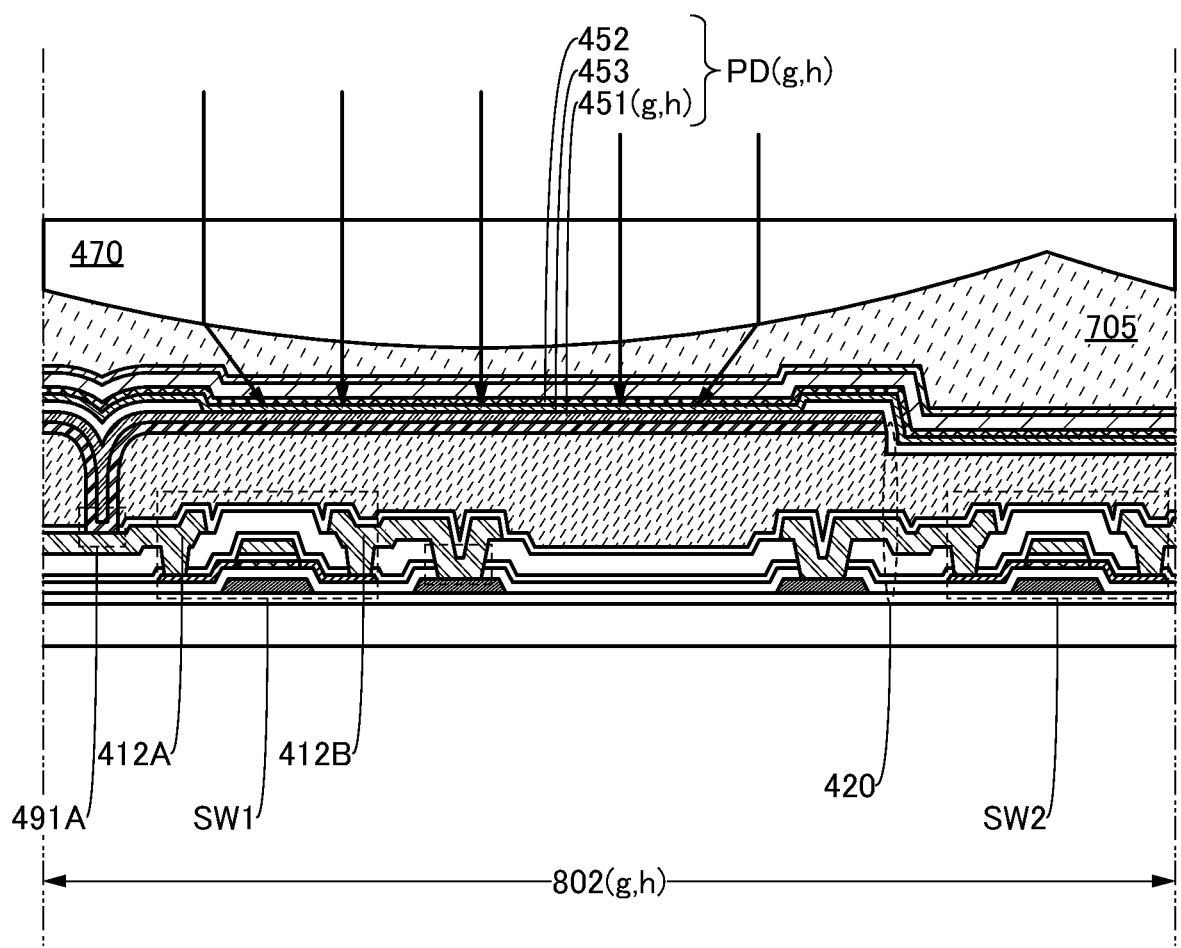
FIG. 7A and FIG. 7B are cross-sectional views illustrating a structure of an input/output device of an embodiment.
Figure 7B:
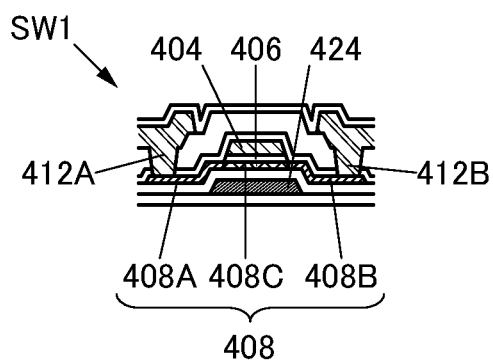

FIG. 7 is a diagram illustrating a structure of an input portion in the input/output device of one embodiment of the present invention. FIG. 7A is a cross-sectional view of a sensor $802(g, h)$ in FIG. 1C, and FIG. 7B is a cross-sectional view illustrating part of FIG. 7A.

Note that in this specification, an integer variable of 1 or more is sometimes used in reference numerals. For example, (p) where p is an integer variable of 1 or more is sometimes used in part of a reference numeral that specifies any of p components at a maximum. For another example, (m, n) where m and n are each an integer variable of 1 or more is sometimes used in part of a reference numeral that specifies any of m×n components at a maximum.

Structure Example 1 of Input/Output Device

The input/output device described in this embodiment includes a display portion 230 and an input portion 240 (see FIG. 1A).

Structure Example 1 of Display Portion 230

The display portion 230 includes a display region 231, and the display region 231 includes the pixel $702(i,j)$ (see FIG. 1A and FIG. 1B).

Pixel $702(i,j)$

The pixel $702(i,j)$ includes the pixel circuit $530(i,j)$ and a liquid crystal element $750(i,j)$ (see FIG. 2A).

Liquid Crystal Element $750(i,j)$

The liquid crystal element $750(i,j)$ includes an electrode $751(i,j)$, an electrode 752, a layer 753 containing a liquid crystal material, an alignment film AF1, and an alignment film AF2 (see FIG. 3A).

Structure Example of Alignment Film AF1 and Alignment Film AF2

The alignment film AF1 includes a region positioned between the electrode $751(i,j)$ and the layer 753 containing a liquid crystal material. The alignment film AF2 includes a region positioned between the electrode 752 and the layer 753 containing a liquid crystal material.

An alignment film that aligns liquid crystals substantially in the horizontal direction can be used as the alignment film AF1 and the alignment film AF2. For example, an angle of approximately 2° to 5° can be a pre-tilt angle.

Note that the alignment film AF2 is subjected to rubbing treatment so as to be antiparallel to the alignment film AF1. The thickness of the alignment film AF1 or the alignment film AF2 can be 70 nm, for example.

Structure Example of Electrode $751(i,j)$ and Electrode 752

The electrode 752 is provided such that an electric field is applied to the layer 753 containing a liquid crystal material between the electrode 752 and the electrode $751(i,j)$. In other words, the electrode 752 is provided such that an electric field across the layer 753 containing a liquid crystal material is formed.

Structure Example of Layer 753 Containing Liquid Crystal Material

The layer 753 containing a liquid crystal material scatters incident light $I_0$ with first scattering intensity when the electric field is in a first state. The layer 753 containing a liquid crystal material scatters the incident light $I_0$ with second scattering intensity when the electric field is in a second state, which is higher than that in the first state. Note that the second scattering intensity is 10 or more times as high as the first scattering intensity.

The layer 753 containing a liquid crystal material contains a liquid crystal material and a polymer material, the layer 753 containing a liquid crystal material is stabilized by the polymer material, and the polymer material is a copolymer of a polyfunctional monomer and a monofunctional monomer.

Structure Example of Liquid Crystal Material

A liquid crystal material MDA-00-3506 produced by Merck can be used for the layer 753 containing a liquid crystal material, for example.

Structure Example of Polyfunctional Monomer

A polyfunctional monomer has a phenyl benzoate skeleton. For example, diacrylate having a phenyl benzoate skeleton can be used as a polyfunctional monomer.

Structure Example of Monofunctional Monomer

A monofunctional monomer has a cyclohexylbenzene skeleton. For example, acrylate having a cyclohexyl skeleton can be used as a monofunctional monomer.

Structure Example 1 of Input Portion 240

The input portion 240 includes a sensing region 241, and the input portion 240 senses an object approaching the sensing region 241 (see FIG. 1A and FIG. 1C). Note that the input portion 240 includes a functional panel 800.

Sensing Region 241

The sensing region 241 includes a region overlapping with the pixel 702($i, j$), and the sensing region 241 includes the sensor 802($g, h$) (see FIG. 1C).

Light Source SL

An LED or the like can be used as a light source SL. For example, a blue LED, a green LED, and a red LED can be used as the light source SL. Specifically, a light source in which a blue LED, a green LED, and a red LED are turned on at the same time to emit white light can be used as the light source SL. Alternatively, a light source in which a blue LED, a green LED, and a red LED are sequentially turned on to emit white light can be used as the light source SL. Note that a light source in which a blue LED is turned on when a blue component in image data VI is exhibited, a green LED is turned on when a green component in the image data VI is exhibited, and a red LED is turned on when a red component in the image data VI is exhibited can be used as the light source SL. In other words, the image data VI can be displayed by a field-sequential method.

This can increase a contrast between a state of transmitting incident light and a state of scattering incident light. Alternatively, an image can be displayed by controlling scattering or transmission of light. Alternatively, for example, an image can be displayed by transmitting or scattering light emitted from the light source SL. Alternatively, a user can see an object behind the display region 231 through the liquid crystal element 750($i, j$). Alternatively, a displayed image can be superimposed on an object behind the display region 231.

Alternatively, a finger or the like that approaches the display region 231 on which an image is displayed can be sensed. Alternatively, data can be input by putting a finger or the like close to the display region 231 on which an image is displayed. As a result, a novel input/output device that is highly convenient or reliable can be provided.

Structure Example of Sensing Region 241

The sensing region 241 includes one or more sensors 802, for example (see FIG. 4).

The sensing region 241 includes a group of sensors 802($g, l$) to 802($g, q$) and a different group of sensors 802($l, h$) to 802($p, h$). Note that g is an integer greater than or equal to 1 and less than or equal to p, h is an integer greater than or equal to 1 and less than or equal to q, and p and q are each an integer greater than or equal to 1.

The group of sensors 802($g, l$) to 802($g, q$) include the sensor 802($g, h$) and are provided in the row direction (the direction indicated by an arrow R2 in the drawing). Note that the direction indicated by the arrow R2 may be the same as or different from the direction indicated by an arrow R1.

The different group of sensors 802($l, h$) to 802($p, h$) include the sensor 802($g, h$) and are provided in the column direction (the direction indicated by an arrow C2 in the drawing) that intersects the row direction.

The sensor 802($g, h$) having a light-transmitting property can be used for the sensing region 241. Thus, the sensing region 241 can have a light-transmitting property. Alternatively, an object behind the sensing region 241 can be seen.

An edge light that emits light from an end portion of a display panel can be used as the light source SL so that the sensing region 241 having a light-transmitting property can overlap with the display region 231. This enables a user to see an object behind the display region 231 through the liquid crystal element 750($i, j$). Alternatively, an object behind the sensing region 241 and the display region 231 can be seen through the sensor 802($g, h$) and the liquid crystal element 750($i, j$). Alternatively, for example, the exterior of a printed circuit board behind the sensing region 241 and the display region 231 can be seen. Alternatively, for example, the exterior of a battery, a secondary battery, or a lithium-ion secondary battery behind the sensing region 241 and the display region 231 can be seen.

Structure Example 1 of Sensor 802($g, h$)

The sensor 802($g, h$) has a function of sensing an approaching pointer. For example, a finger, a stylus pen, or the like can be used as the pointer. For example, a piece of metal, a coil, or the like can be used for the stylus pen.

Specifically, a capacitive proximity sensor, an electromagnetic inductive proximity sensor, an optical proximity sensor, a resistive proximity sensor, or the like can be used as the sensor 802($g, h$).

A plurality of types of sensors can be used in combination. For example, a sensor that senses a finger and a sensor that senses a stylus pen can be used in combination.

This allows determination of the kind of a pointer. Alternatively, different instructions can be associated with pieces of sensing data depending on the kind of a pointer that has been determined. Specifically, in the case where it is determined that a finger is used as a pointer, sensing data can be associated with a gesture. Alternatively, in the case where it is determined that a stylus pen is used as a pointer, sensing data can be associated with drawing processing.

Specifically, a finger can be sensed using a capacitive, pressure-sensitive, or optical proximity sensor. Alternatively, a stylus pen can be sensed using an electromagnetic inductive or optical proximity sensor.

Structure Example 2 of Input Portion 240

The input portion 240 includes an oscillation circuit OSC and a sensing circuit DC (see FIG. 4).

The oscillation circuit OSC supplies a search signal to the sensor 802($g, h$). For example, a rectangular wave, a sawtooth wave, a triangular wave, or a sine wave can be used as the search signal.

The sensor 802($g, h$) generates and supplies a sensing signal that changes in accordance with the search signal and the distance to a pointer approaching the sensor 802($g, h$).

The sensing circuit DC supplies input data in accordance with the sensing signal.

Accordingly, the distance from an approaching pointer to the sensing region 241 can be sensed. Alternatively, the position in the sensing region 241 where the pointer comes the closest can be sensed.

Structure Example 2 of Sensor 802(g, h)

The sensor 802(g, h) includes a photoelectric conversion element PD(g, h) (see FIG. 5A). The photoelectric conversion element PD(g, h) is electrically connected to the sensor 802(g, h) and a conductive film VCOM. The sensor 802(g, h) includes the sensing circuit 430(g, h). Note that the sensing circuit 430(g, h) includes a switch SW1, a switch SW2, a switch SW3, a transistor M, and a node FD1(g, h). The switch SW1 includes a first terminal electrically connected to the photoelectric conversion element PD(g, h) and a second terminal electrically connected to the node FD1(g, h), and has a function of controlling the on state or the off state on the basis of the potential of a wiring TX(g). The switch SW3 includes a first terminal electrically connected to the node FD1(g, h) and a second terminal electrically connected to a conductive film VR, and has a function of controlling the on state or the off state on the basis of the potential of a wiring RS(g). The transistor M includes a gate electrode electrically connected to the node FD1(g, h) and a first electrode electrically connected to a conductive film VPI. The switch SW2 includes a first terminal electrically connected to a second electrode of the transistor M and a second terminal electrically connected to a conductive film WX(h), and has a function of controlling the on state or the off state on the basis of the potential of a wiring SE(g).

The photoelectric conversion element PD(g, h) senses light entering through the pixel 702(i, j). Note that a lens 470 can be used for the photoelectric conversion element PD(g, h). Accordingly, the amount of light entering the photoelectric conversion element PD(g, h) can be increased.

Accordingly, an image of a finger, a fingerprint, a palm, a palm print, or the like that approaches the sensing region 241 can be captured. Alternatively, an image of the appearance, finger, face, or the like of a user can be captured. Alternatively, an image can be captured while being displayed on the display region 231. Alternatively, user authentication can be performed while an image is displayed on the display region 231. As a result, a novel input/output device that is highly convenient or reliable can be provided.

Photoelectric Conversion Element PD(g, h)

The photoelectric conversion element PD(g, h) includes an electrode 451(g, h), an electrode 452, and a semiconductor film 453 (see FIG. 7A).

The semiconductor film 453 includes a p-type semiconductor film and an n-type semiconductor film.

For example, a stacked-layer film in which a p-type semiconductor film and an n-type semiconductor film are stacked in contact with each other can be used as the semiconductor film 453. Note that the photoelectric conversion element PD(g, h) in which a stacked-layer film with such a structure is used as the semiconductor film 453 can be referred to as a PN photodiode.

For example, a stacked-layer film in which a p-type semiconductor film, an i-type semiconductor film, and an n-type semiconductor film are stacked so that the i-type semiconductor film is positioned between the p-type semiconductor film and the n-type semiconductor film can be used as the semiconductor film 453. Note that the photoelectric conversion element PD(g, h) in which a stacked-layer film with such a structure is used as the semiconductor film 453 can be referred to as a PIN photodiode.

For example, a stacked-layer film in which a pt-type semiconductor film, a p⁻-type semiconductor film, a p-type semiconductor film, and an n-type semiconductor film are stacked so that the p⁻-type semiconductor film is positioned between the p⁺-type semiconductor film and the n-type semiconductor film and the p-type semiconductor film is positioned between the p⁻-type semiconductor film and the n-type semiconductor film can be used as the semiconductor film 453. Note that the photoelectric conversion element PD(g, h) in which a stacked-layer film with such a structure is used as the semiconductor film 453 can be referred to as an avalanche photodiode.

For example, an electron-accepting organic semiconductor material such as fullerene (e.g., $C_{60}$ or $C_{70}$) or its derivative can be used for the n-type semiconductor film.

For example, an electron-donating organic semiconductor material such as copper(II) phthalocyanine (CuPc) or tetraphenyldibenzoperiflanthene (DBP) can be used for the p-type semiconductor film.

For example, a film obtained by co-evaporation of an electron-accepting semiconductor material and an electron-donating semiconductor material can be used as the i-type semiconductor film.

Structure Example 3 of Input Portion 240

The input portion 240 includes a functional layer 420 (see FIG. 5A).

Structure Example of Functional Layer 420

The functional layer 420 includes the sensing circuit 430(g, h) and an opening portion 491A. Note that the sensing circuit 430(g, h) is electrically connected to the photoelectric conversion element PD(g, h) in the opening portion 491A.

Structure Example of Sensing Circuit 430(g, h)

The sensing circuit 430(g, h) is electrically connected to the wiring TX(g), the wiring SE(g), the wiring RS(g), the conductive film WX(h), the conductive film VPI, and the conductive film VR (see FIG. 5B).

A switch, a transistor, a diode, a resistor, an inductor, a capacitor, or the like can be used in the sensing circuit 430(g, h), for example. Specifically, a transistor can be used as a switch.

For example, in the case where a plurality of transistors are used in the sensing circuit, in a step of forming a semiconductor film of a transistor, a semiconductor film of a different transistor can be formed.

Structure Example of Transistor

A bottom-gate transistor or a top-gate transistor can be used in the sensing circuit 430(g, h), for example.

The transistor includes a semiconductor film 408, a conductive film 404, a conductive film 412A, and a conductive film 412B (see FIG. 7B).

The semiconductor film 408 includes a region 408A electrically connected to the conductive film 412A and a region 408B electrically connected to the conductive film 412B. The semiconductor film 408 includes a region 408C between the region 408A and the region 408B.

The conductive film 404 includes a region overlapping with the region 408C, and the conductive film 404 has a function of a gate electrode.

An insulating film 406 includes a region positioned between the semiconductor film 408 and the conductive film 404. The insulating film 406 has a function of a gate insulating film.

The conductive film 412A has one of a function of a source electrode and a function of a drain electrode, and the conductive film 412B has the other of the function of the source electrode and the function of the drain electrode.

A conductive film 424 can be used for the transistor. The semiconductor film 408 is positioned between the conductive film 404 and a region included in the conductive film 424. The conductive film 424 has a function of a second gate electrode. The conductive film 424 can be electrically connected to the conductive film 404, for example.

Structure Example 4 of Input Portion 240

The input portion 240 includes a selection line driver circuit GD and a reading circuit RD (see FIG. 6). The selection line driver circuit GD includes a driver circuit RSD, a driver circuit TXD, and a driver circuit SED.

Structure Example of Selection Line Driver Circuit GD

The selection line driver circuit GD has a function of supplying a first selection signal, a second selection signal, and a third selection signal.

Structure Example of Reading Circuit RD

The reading circuit RD is supplied with a first image signal, and the reading circuit RD supplies image data.

Structure Example 2 of Display Portion 230

The display portion 230 includes a functional layer 520 (see FIG. 2A).

Structure Example 1 of Functional Layer 520

The functional layer 520 includes the pixel circuit 530(i, j) and an opening portion 591A. Note that the pixel circuit 530(i, j) is electrically connected to the liquid crystal element 750(i, j) in the opening portion 591A.

Structure Example 1 of Pixel Circuit 530(i,j)

The pixel circuit 530(i, j) is electrically connected to a scan line G1(i) and a signal line S1(j) (see FIG. 2B).

A switch, a transistor, a diode, a resistor, an inductor, a capacitor, or the like can be used in the pixel circuit 530(i, j), for example. Specifically, a transistor can be used as a switch.

For example, in the case where a plurality of transistors are used in the pixel circuit, in a step of forming a semiconductor film of a transistor, a semiconductor film of a different transistor can be formed.

Structure Example 2 of Pixel Circuit 530(i,j)

The pixel circuit 530(i, j) is electrically connected to the liquid crystal element 750(i, j) (see FIG. 2B).

The pixel circuit 530(i, j) includes a switch SW11, a switch SW12, a capacitor C11, a capacitor C12, a node N1(i, j), and a conductive film VCOM1.

The switch SW11 includes a first terminal to which a first signal is supplied, and the switch SW11 includes a second terminal electrically connected to the node N1(i, j).

The capacitor C11 includes a first electrode electrically connected to the node N1(i, j), and the capacitor C11 includes a second electrode electrically connected to a conductive film CSCOM.

The switch SW12 includes a first terminal to which a second signal is supplied, and the switch SW12 includes a second terminal electrically connected to a first electrode of the capacitor C12.

The capacitor C12 includes a second electrode electrically connected to the node N1(i,j).

The liquid crystal element 750(i, j) performs display on the basis of the potential of the node N1(i, j).

Thus, the potential of the node N1(i, j) can be controlled using the switch SW11 and the switch SW12. Alternatively, the potential of the node N1(i,j) can be controlled using the switch SW11, and the potential of the node N1(i, j) can be changed using the switch SW12. Alternatively, a potential difference generated between the signal line S1(j) and a signal line S2(j) can be stored in the capacitor C12 using the switch SW11 in the on state and the switch SW12 in the on state. Alternatively, the potential of the node N1(i, j) can be changed using the potential of the signal line S2(j), with the use of the switch SW11 in the off state and the switch SW12 in the on state. Alternatively, the changing potential can be supplied to the liquid crystal element 750(i, j). Alternatively, display can be performed in accordance with the changing potential. Alternatively, the display of the liquid crystal element 750(i, j) can be changed. Alternatively, the operation of the liquid crystal element 750(i, j) can be emphasized. Alternatively, the response of the liquid crystal element 750(i, j) can be made faster. As a result, a novel input/output device that is highly convenient or reliable can be provided.

Alternatively, a high voltage can be supplied to the liquid crystal element 750(i, j). Alternatively, a high electric field can be applied to the layer 753 containing a liquid crystal material. Alternatively, the alignment of polymer-stabilized liquid crystal materials can be controlled. As a result, a novel input/output device that is highly convenient or reliable can be provided.

Structure Example of Transistor

A bottom-gate transistor or a top-gate transistor can be used in the pixel circuit 530(i, j), for example.

The transistor includes a semiconductor film 508, a conductive film 504, a conductive film 512A, and a conductive film 512B (see FIG. 3B).

The semiconductor film 508 includes a region 508A electrically connected to the conductive film 512A and a region 508B electrically connected to the conductive film 512B. The semiconductor film 508 includes a region 508C between the region 508A and the region 508B.

The conductive film 504 includes a region overlapping with the region 508C, and the conductive film 504 has a function of a gate electrode.

An insulating film 506 includes a region positioned between the semiconductor film 508 and the conductive film 504. The insulating film 506 has a function of a gate insulating film.

The conductive film 512A has one of a function of a source electrode and a function of a drain electrode, and the conductive film 512B has the other of the function of the source electrode and the function of the drain electrode.

A conductive film 524 can be used for the transistor. The semiconductor film 508 is positioned between the conductive film 504 and a region included in the conductive film 524. The conductive film 524 has a function of a second gate electrode. The conductive film 524 can be electrically connected to the conductive film 504, for example. Note that the conductive film 524 can be used as the scan line G1(*i*).

Note that in a step of forming the semiconductor film used in the transistor of the pixel circuit, a semiconductor film used in a transistor of a driver circuit can be formed.

Structure Example 1 of Semiconductor Film 508

A semiconductor containing a Group 14 element can be used for the semiconductor film 508, for example. Specifically, a semiconductor containing silicon can be used for the semiconductor film 508.

Hydrogenated Amorphous Silicon

For example, hydrogenated amorphous silicon can be used for the semiconductor film 508. Alternatively, microcrystalline silicon or the like can be used for the semiconductor film 508. Thus, a display panel having less display unevenness than a display panel that uses polysilicon for the semiconductor film 508, for example, can be provided. Alternatively, the size of the display panel can be easily increased.

Polysilicon

For example, polysilicon can be used for the semiconductor film 508. In this case, for example, the field-effect mobility of the transistor can be higher than that of a transistor that uses hydrogenated amorphous silicon for the semiconductor film 508. Alternatively, for example, the driving capability can be higher than that of a transistor that uses hydrogenated amorphous silicon for the semiconductor film 508. Alternatively, for example, the aperture ratio of the pixel can be higher than that in the case of using a transistor that uses hydrogenated amorphous silicon for the semiconductor film 508.

Alternatively, for example, the reliability of the transistor can be higher than that of a transistor that uses hydrogenated amorphous silicon for the semiconductor film 508.

Alternatively, the temperature required for fabrication of the transistor can be lower than that required for a transistor that uses single crystal silicon, for example.

Alternatively, the semiconductor film used for the transistor in the driver circuit can be formed in the same process as the semiconductor film used for the transistor in the pixel circuit. Alternatively, the driver circuit can be formed over the same substrate over which the pixel circuit is formed. Alternatively, the number of components included in an electronic device can be reduced.

Single Crystal Silicon

For example, single crystal silicon can be used for the semiconductor film 508. In this case, for example, the resolution can be higher than that of a display panel that uses hydrogenated amorphous silicon for the semiconductor film 508. Alternatively, for example, a display panel having less display unevenness than a display panel that uses polysilicon for the semiconductor film 508 can be provided. Alternatively, for example, smart glasses or a head mounted display can be provided.

Structure Example 2 of Semiconductor Film 508

For example, a metal oxide can be used for the semiconductor film 508. Thus, a pixel circuit can hold an image signal for a longer time than a pixel circuit utilizing a transistor that uses amorphous silicon for a semiconductor film. Specifically, a selection signal can be supplied at a frequency lower than 30 Hz, preferably lower than 1 Hz, further preferably less than once per minute with the suppressed occurrence of flickers. Consequently, fatigue accumulation in a user of an input/output device can be reduced. Moreover, power consumption for driving can be reduced.

A transistor using an oxide semiconductor can be used, for example. Specifically, an oxide semiconductor containing indium or an oxide semiconductor containing indium, gallium, and zinc can be used for the semiconductor film.

A transistor having a lower leakage current in an off state than a transistor that uses amorphous silicon for a semiconductor film can be used, for example. Specifically, a transistor that uses an oxide semiconductor for a semiconductor film can be used.

A 25-nm-thick film containing indium, gallium, and zinc can be used as the semiconductor film 508, for example.

A conductive film in which a 10-nm-thick film containing tantalum and nitrogen and a 300-nm-thick film containing copper are stacked can be used as the conductive film 504, for example. Note that the film containing copper includes a region; between the region and the insulating film 506, the film containing tantalum and nitrogen is positioned.

A stacked-layer film in which a 400-nm-thick film containing silicon and nitrogen and a 200-nm-thick film containing silicon, oxygen, and nitrogen are stacked can be used as the insulating film 506, for example. Note that the film containing silicon and nitrogen includes a region; between the region and the semiconductor film 508, the film containing silicon, oxygen, and nitrogen is positioned.

A conductive film in which a 50-nm-thick film containing tungsten, a 400-nm-thick film containing aluminum, and a 100-nm-thick film containing titanium are stacked in this order can be used as the conductive film 512A or the conductive film 512B, for example. Note that the film containing tungsten includes a region in contact with the semiconductor film 508.

A manufacturing line for a bottom-gate transistor that uses amorphous silicon as a semiconductor can be easily remodeled into a manufacturing line for a bottom-gate transistor that uses an oxide semiconductor as a semiconductor, for example. Furthermore, for example, a manufacturing line for a top-gate transistor that uses polysilicon as a semiconductor can be easily remodeled into a manufacturing line for a top-gate transistor that uses an oxide semiconductor as a semiconductor. In either remodeling, an existing manufacturing line can be effectively utilized.

This can suppress flickering. Alternatively, the power consumption can be reduced. Alternatively, a moving image with quick movements can be smoothly displayed. Alternatively, a photograph and the like can be displayed with a wide range of grayscale. As a result, a novel display panel that is highly convenient or reliable can be provided.

Structure Example 3 of Semiconductor Film 508

For example, a compound semiconductor can be used as the semiconductor of the transistor. Specifically, a semiconductor containing gallium arsenide can be used.

For example, an organic semiconductor can be used as the semiconductor of the transistor. Specifically, an organic semiconductor containing polyacenes or graphene can be used for a semiconductor film.

Structure Example of Capacitor

The capacitor includes one conductive film, a different conductive film, and an insulating film, and the insulating film includes a region positioned between the one conductive film and the different conductive film.

For example, the conductive film 504, the conductive film 512A, and the insulating film 506 can be used for the capacitor.

For example, a conductive film 754($i, j$), the electrode 751($i, j$), and an insulating film 521B can be used for the capacitor C12 (see FIG. 3A). Note that the insulating film 521B includes a region positioned between the conductive film 754($i, j$) and the electrode 751($i, j$).

Structure Example 2 of Functional Layer 520

The functional layer 520 includes an insulating film 521A, the insulating film 521B, an insulating film 518, an insulating film 516, the insulating film 506, an insulating film 501C, and the like (see FIG. 3A and FIG. 3B).

The insulating film 521 includes a region positioned between the pixel circuit 530($i, j$) and the liquid crystal element 750($i, j$).

The insulating film 518 includes a region positioned between the insulating film 521 and the insulating film 501C.

The insulating film 516 includes a region positioned between the insulating film 518 and the insulating film 501C.

The insulating film 506 includes a region positioned between the insulating film 516 and the insulating film 501C.

Insulating Film 521

An insulating inorganic material, an insulating organic material, or an insulating composite material containing an inorganic material and an organic material, for example, can be used for the insulating film 521.

Specifically, an inorganic oxide film, an inorganic nitride film, an inorganic oxynitride film, or the like, or a layered material in which a plurality of films selected from these films are stacked can be used as the insulating film 521.

For example, a film including a silicon oxide film, a silicon nitride film, a silicon oxynitride film, an aluminum oxide film, or the like, or a film including a layered material in which a plurality of films selected from these films are stacked can be used as the insulating film 521. Note that the silicon nitride film is a dense film and has an excellent function of inhibiting diffusion of impurities.

For example, for the insulating film 521, polyester, polyolefin, polyamide, polyimide, polycarbonate, polysiloxane, an acrylic resin, or the like, or a layered material, a composite material, or the like of a plurality of resins selected from these resins can be used. Alternatively, a photosensitive material may be used. Thus, the insulating film 521 can planarize a level difference due to various components overlapping with the insulating film 521, for example.

Note that polyimide is excellent in thermal stability, insulating property, toughness, low dielectric constant, low coefficient of thermal expansion, chemical resistance, and other properties compared with other organic materials. Accordingly, in particular, polyimide can be suitably used for the insulating film 521 or the like.

For example, a film formed using a photosensitive material can be used as the insulating film 521. Specifically, a film formed using photosensitive polyimide, a photosensitive acrylic resin, or the like can be used as the insulating film 521.

Insulating Film 518

The material that can be used for the insulating film 521, for example, can be used for the insulating film 518.

For example, a material that has a function of inhibiting diffusion of oxygen, hydrogen, water, an alkali metal, an alkaline earth metal, and the like can be used for the insulating film 518. Specifically, a nitride insulating film can be used as the insulating film 518. For example, silicon nitride, silicon nitride oxide, aluminum nitride, aluminum nitride oxide, or the like can be used for the insulating film 518. Thus, diffusion of impurities into a semiconductor film of a transistor can be inhibited.

Insulating Film 516

The material that can be used for the insulating film 521, for example, can be used for the insulating film 516.

Specifically, a film formed by a fabrication method different from that of the insulating film 518 can be used as the insulating film 516.

Insulating Film 506

The material that can be used for the insulating film 521, for example, can be used for the insulating film 506.

Specifically, a film including a silicon oxide film, a silicon oxynitride film, a silicon nitride oxide film, a silicon nitride film, an aluminum oxide film, a hafnium oxide film, an yttrium oxide film, a zirconium oxide film, a gallium oxide film, a tantalum oxide film, a magnesium oxide film, a lanthanum oxide film, a cerium oxide film, or a neodymium oxide film can be used as the insulating film 506.

Insulating Film 501C

The material that can be used for the insulating film 521, for example, can be used for the insulating film 501C. Specifically, a material containing silicon and oxygen can be used for the insulating film 501C. Thus, diffusion of impurities into the pixel circuit, the liquid crystal element, or the like can be inhibited.

Structure Example 3 of Functional Layer 520

The functional layer 520 includes a conductive film, a wiring, and a terminal. A material having conductivity can be used for the conductive film, the wiring, the terminal, and the like.

Wiring and the Like

For example, an inorganic conductive material, an organic conductive material, a metal, a conductive ceramic, or the like can be used for the wiring or the like.

Specifically, a metal element selected from aluminum, gold, platinum, silver, copper, chromium, tantalum, titanium, molybdenum, tungsten, nickel, iron, cobalt, palladium, and manganese, or the like can be used for the wiring or the like. Alternatively, an alloy containing the above-described metal element, or the like can be used for the wiring or the like. In particular, an alloy of copper and manganese is suitable for microfabrication using a wet etching method.

Specifically, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure of a titanium film, an aluminum film stacked over the titanium film, and a titanium film further formed thereover, or the like can be used for the wiring or the like.

Specifically, a conductive oxide such as indium oxide, indium tin oxide, indium zinc oxide, zinc oxide, or zinc oxide to which gallium is added can be used for the wiring or the like.

Specifically, a film containing graphene or graphite can be used for the wiring or the like.

For example, a film containing graphene oxide is formed and the film containing graphene oxide is reduced, so that a film containing graphene can be formed. As a reducing method, a method with application of heat, a method using a reducing agent, or the like can be given.

For example, a film including a metal nanowire can be used for the wiring or the like. Specifically, a nanowire containing silver can be used.

Specifically, a conductive polymer can be used for the wiring or the like.

Note that a terminal 519B can be electrically connected to a flexible printed circuit FPC1 using a conductive material, for example (see FIG. 2A).

Structure Example 1 of Display Panel 700

Figure 9A:
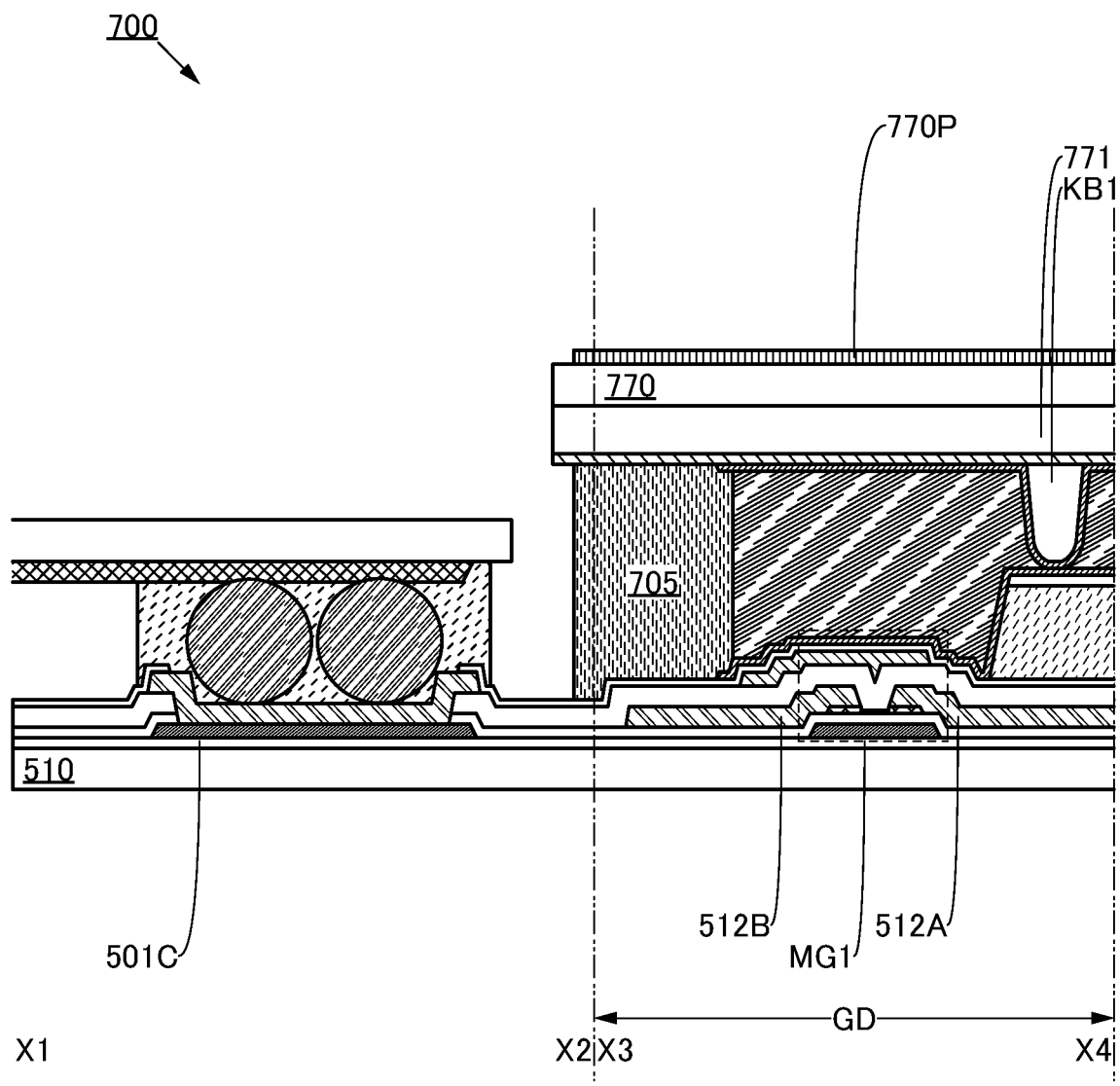
FIG. 9A and FIG. 9B are cross-sectional views illustrating a structure of a display panel in an input/output device of an embodiment.

A display panel 700 includes a base material 510, a base material 770, and a sealant 705 (see FIG. 9A).

Base Material 510 and Base Material 770

A light-transmitting material can be used for the base material 510 or the base material 770.

For example, a flexible material can be used for the base material 510 or the base material 770. Thus, a flexible display panel can be provided.

For example, a material with a thickness less than or equal to 0.7 mm and greater than or equal to 0.1 mm can be used. Specifically, a material polished to a thickness of approximately 0.1 mm can be used. As a result, the weight can be reduced.

A glass substrate of the 6th generation (1500 mm×1850 mm), the 7th generation (1870 mm×2200 mm), the 8th generation (2200 mm×2400 mm), the 9th generation (2400 mm×2800 mm), the 10th generation (2950 mm×3400 mm), or the like can be used as the base material 510 or the base material 770. Thus, a large-sized display device can be manufactured.

For the base material 510 or the base material 770, an organic material, an inorganic material, a composite material of an organic material and an inorganic material or the like, or the like can be used.

For example, an inorganic material such as glass, ceramic, or a metal can be used. Specifically, non-alkali glass, soda-lime glass, potash glass, crystal glass, aluminosilicate glass, tempered glass, chemically tempered glass, quartz, sapphire, or the like can be used for the base material 510 or the base material 770. Alternatively, aluminosilicate glass, tempered glass, chemically tempered glass, sapphire, or the like can be suitably used for the base material 510 or the base material 770 that is provided on the side close to a user of the display panel. Thus, the display panel can be prevented from being broken or damaged by the use thereof.

Specifically, an inorganic oxide film, an inorganic nitride film, an inorganic oxynitride film, or the like can be used. For example, a silicon oxide film, a silicon nitride film, a silicon oxynitride film, an aluminum oxide film, or the like can be used. Stainless steel, aluminum, or the like can be used for the base material 510 or the base material 770.

For example, a single crystal semiconductor substrate of silicon or silicon carbide, a polycrystalline semiconductor substrate, a compound semiconductor substrate of silicon germanium or the like, an SOI substrate, or the like can be used as the base material 510 or the base material 770. Thus, a semiconductor element can be formed over the base material 510 or the base material 770.

For example, an organic material such as a resin, a resin film, or plastic can be used for the base material 510 or the base material 770. Specifically, a material containing polyester, polyolefin, polyamide (nylon, aramid, or the like), polyimide, polycarbonate, polyurethane, an acrylic resin, an epoxy resin, or a resin having a siloxane bond can be used for the base material 510 or the base material 770. For example, a resin film, a resin plate, a stacked-layer material, or the like containing any of these materials can be used. As a result, the weight can be reduced. Alternatively, for example, the frequency of occurrence of breakage due to dropping or the like can be reduced.

Specifically, polyethylene terephthalate (PET), polyethylene naphthalate (PEN), polyethersulfone (PES), a cycloolefin polymer (COP), a cycloolefin copolymer (COC), or the like can be used for the base material 510 or the base material 770.

For example, a composite material formed by attaching a metal plate, a thin glass plate, or a film of an inorganic material or the like to a resin film or the like can be used for the base material 510 or the base material 770. For example, a composite material formed by dispersing a fibrous or particulate metal, glass, inorganic material, or the like into a resin can be used for the base material 510 or the base material 770. For example, a composite material formed by dispersing a fibrous or particulate resin, organic material, or the like into an inorganic material can be used for the base material 510 or the base material 770.

Furthermore, a single-layer material or a material in which a plurality of layers are stacked can be used for the base material 510 or the base material 770. For example, a material in which insulating films and the like are stacked can be used. Specifically, a material in which one or a plurality of films selected from a silicon oxide layer, a silicon nitride layer, a silicon oxynitride layer, and the like are stacked can be used. Thus, diffusion of impurities contained in the base material can be prevented, for example. Alternatively, diffusion of impurities contained in glass or a resin can be prevented. Alternatively, diffusion of impurities that pass through a resin can be prevented.

Furthermore, paper, wood, or the like can be used for the base material 510 or the base material 770.

For example, a material having heat resistance high enough to withstand heat treatment in the manufacturing process can be used for the base material 510 or the base material 770. Specifically, a material that is resistant to heat applied in the manufacturing process of directly forming the transistor, the capacitor, or the like can be used for the base material 510 or the base material 770.

For example, a method in which an insulating film, a transistor, a capacitor, or the like is formed on a substrate which is for use in the process and is resistant to heat applied in the manufacturing process, and the formed insulating film, transistor, capacitor, or the like is transferred to the base material 510 or the base material 770 can be used. Accordingly, an insulating film, a transistor, a capacitor, or the like can be formed on a flexible substrate, for example.

Sealant 705

The sealant 705 includes a region positioned between the functional layer 520 and the base material 770 and has a function of bonding the functional layer 520 and the base material 770 together.

An inorganic material, an organic material, a composite material of an inorganic material and an organic material, or the like can be used for the sealant 705.

For example, an organic material such as a thermally fusible resin or a curable resin can be used for the sealant 705.

For example, an organic material such as a reactive curable adhesive, a photocurable adhesive, a thermosetting adhesive, and/or an anaerobic adhesive can be used for the sealant 705.

Specifically, an adhesive containing an epoxy resin, an acrylic resin, a silicone resin, a phenol resin, a polyimide resin, an imide resin, a PVC (polyvinyl chloride) resin, a PVB (polyvinyl butyral) resin, an EVA (ethylene vinyl acetate) resin, or the like can be used for the sealant 705.

Structure Example 2 of Display Panel 700

The display panel 700 includes a functional layer 720 (see FIG. 3A). In addition, the display panel 700 includes a structure body KB1, a functional film 770P, and the like.

Functional Layer 720

The functional layer 720 includes a region positioned between the liquid crystal element 750(*i, j*) and the base material 770. For example, an insulating film 771 can be used for the functional layer 720.

Structure Body KB1

The structure body KB1 includes a region positioned between the functional layer 520 and the base material 770. The structure body KB1 has a function of providing a predetermined space between the functional layer 520 and the base material 770.

Functional Film 770P and the Like

The functional film 770P includes a region overlapping with the liquid crystal element 750(*i, j*).

For example, an anti-reflection film or the like can be used as the functional film 770P.

For example, an anti-reflection film with a thickness of 1 µm or less can be used as the functional film 770P. Specifically, a stacked-layer film in which three or more layers, preferably five or more layers, further preferably 15 or more layers of dielectrics are stacked can be used as the functional film 770P. This allows the reflectivity to be as low as 0.5% or less, preferably 0.08% or less.

Furthermore, an antistatic film suppressing the attachment of a dust, a water repellent film suppressing the attachment of a stain, a non-glare film (anti-glare film), a hard coat film suppressing generation of a scratch in use, or the like can be used as the functional film 770P.

Note that this embodiment can be combined with other embodiments in this specification as appropriate.

Embodiment 2

In this embodiment, a structure of an input/output device of one embodiment of the present invention will be described with reference to FIG. 8 and FIG. 9.

Figure 8:
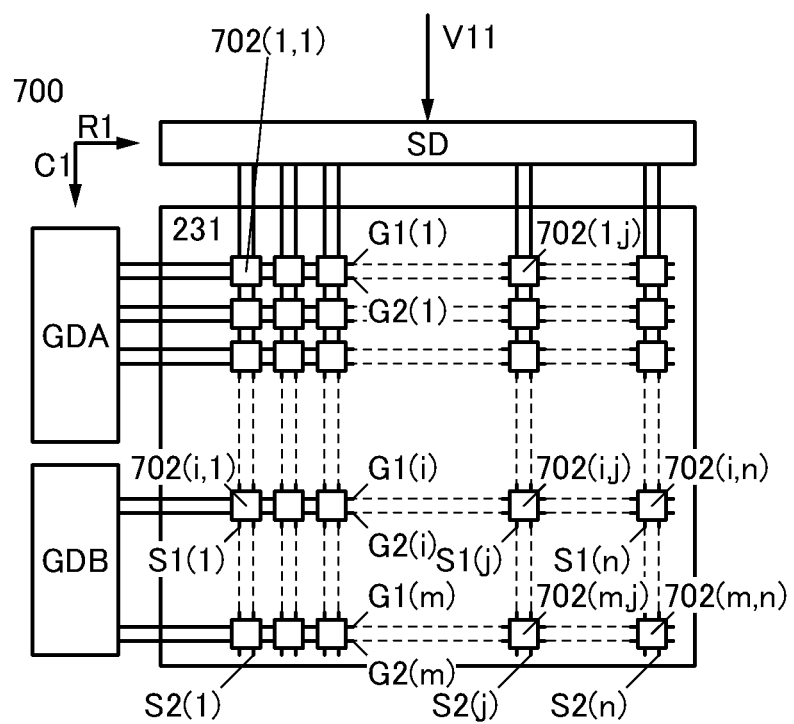
FIG. 8 is a block diagram illustrating a structure of a display panel in an input/output device of an embodiment.

FIG. 8 is a block diagram illustrating a structure of the display panel in the input/output device of one embodiment of the present invention.

Figure 9B:
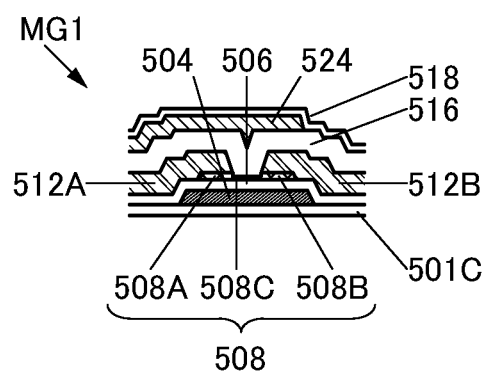

FIG. 9 is a diagram illustrating the structure of the display panel in the input/output device of one embodiment of the present invention. FIG. 9A is a cross-sectional view along cutting lines X1-X2 and X3-X4 in FIG. 1B, and FIG. 9B is a cross-sectional view illustrating part of FIG. 9A.

Structure Example 1 of Input/Output Device

In the input/output device described in this embodiment, the display region 231 includes a group of pixels 702(*i*, 1) to 702(*i, n*), a different group of pixels 702(1, *j*) to 702(*m, j*), the first scan line G1(*i*), a second scan line G2(*i*), the first signal line S1(*j*), and the second signal line S2(*j*) (see FIG. 8). Note that i is an integer greater than or equal to 1 and less than or equal to m, j is an integer greater than or equal to 1 and less than or equal to n, and m and n are each an integer greater than or equal to 1. Furthermore, 2m+1 and 3m are each an integer.

Although not illustrated, the display region 231 includes a conductive film CSCOM and a conductive film VCOM1.

The group of pixels 702(*i*, 1) to 702(*i, n*) are arranged in the row direction (the direction indicated by the arrow R1 in the drawing), and the group of pixels 702(*i*, 1) to 702(*i, n*) include the pixel 702(*i, j*).

The different group of pixels 702(1, *j*) to 702(*m, j*) are arranged in the column direction intersecting the row direction (the direction indicated by an arrow C1 in the drawing), and the different group of pixels 702(1, *j*) to 702(*m, j*) include the pixel 702(*i, j*).

The scan line G1(*i*) is electrically connected to the group of pixels 702(*i*, 1) to 702(*i, n*) arranged in the row direction. The scan line G2(*i*) is electrically connected to the group of pixels 702(*i*, 1) to 702(*i, n*) arranged in the row direction.

The signal line S1(*j*) is electrically connected to the different group of pixels 702(1,*j*) to 702(*m, j*) arranged in the column direction. The signal line S2(*j*) is electrically connected to the different group of pixels 702(1,*j*) to 702(*m, j*) arranged in the column direction.

Thus, image data can be supplied to a plurality of pixels. Alternatively, the image data can be displayed. As a result, a novel input/output device that is highly convenient or reliable can be provided.

Structure Example 2 of Input/Output Device

In the input/output device described in this embodiment, the display panel 700 includes one or more driver circuits. For example, a driver circuit GD and a driver circuit SD can be included (see FIG. 8).

Driver Circuit GDA and Driver Circuit GDB

A driver circuit GDA and a driver circuit GDB can be used as the driver circuit GD. For example, the driver circuit GDA and the driver circuit GDB each have a function of supplying a selection signal on the basis of a control signal SP.

Specifically, the driver circuit GDA and the driver circuit GDB have a function of supplying a selection signal to one scan line at a frequency of 30 Hz or higher, preferably 60 Hz or higher, on the basis of the control signal SP. Accordingly, a moving image can be smoothly displayed.

Alternatively, the driver circuit GDA and the driver circuit GDB have a function of supplying a selection signal to one scan line at a frequency lower than 30 Hz, preferably lower than 1 Hz, further preferably less than once a minute, on the basis of the control signal SP. Accordingly, a still image in which flickering is reduced can be displayed.

In the case where a plurality of driver circuits are provided, for example, the frequency at which the driver circuit GDA supplies a selection signal and the frequency at which the driver circuit GDB supplies a selection signal can be made different from each other. Specifically, the selection signal can be supplied at a higher frequency to a region on which a moving image is displayed than to a region on which a still image is displayed. Accordingly, a still image in which flickering is reduced can be displayed on a region, and a moving image can be smoothly displayed on another region.

The frame frequency can be made variable. For example, display can be performed at a frame frequency higher than or equal to 1 Hz and lower than or equal to 120 Hz. Alternatively, display can be performed at a frame frequency of 120 Hz by a progressive method.

A bottom-gate transistor, a top-gate transistor, or the like can be used in the driver circuit GD, for example. Specifically, a transistor MG1 can be used in the driver circuit GD (see FIG. 9).

Note that, for example, a semiconductor film used in a transistor of the driver circuit GD can be formed in a step of forming a semiconductor film used in a transistor of the pixel circuit 530(*i, j*).

Driver Circuit SD

The driver circuit SD has a function of generating an image signal on the basis of data V11 and a function of supplying the image signal to a pixel circuit electrically connected to one liquid crystal element (see FIG. 8).

A variety of sequential circuits or the like, such as a shift register, can be used as the driver circuit SD, for example.

For example, an integrated circuit formed on a silicon substrate can be used as the driver circuit SD.

An integrated circuit can be connected to a terminal by a COG (Chip on glass) method or a COF (Chip on Film) method, for example. Specifically, an anisotropic conductive film can be used to connect an integrated circuit to a terminal.

Note that this embodiment can be combined with other embodiments in this specification as appropriate.

Embodiment 3

In this embodiment, a structure of a display device of one embodiment of the present invention will be described with reference to FIG. 10.

FIG. 10 is a diagram illustrating the structure of the display device of one embodiment of the present invention. FIG. 10A is a block diagram of the display device of one embodiment of the present invention, and FIG. 10B1 to FIG. 10B3 are projection views illustrating the appearance of the display device of one embodiment of the present invention.

Structure Example 1 of Display Portion 230

Figure 10A:
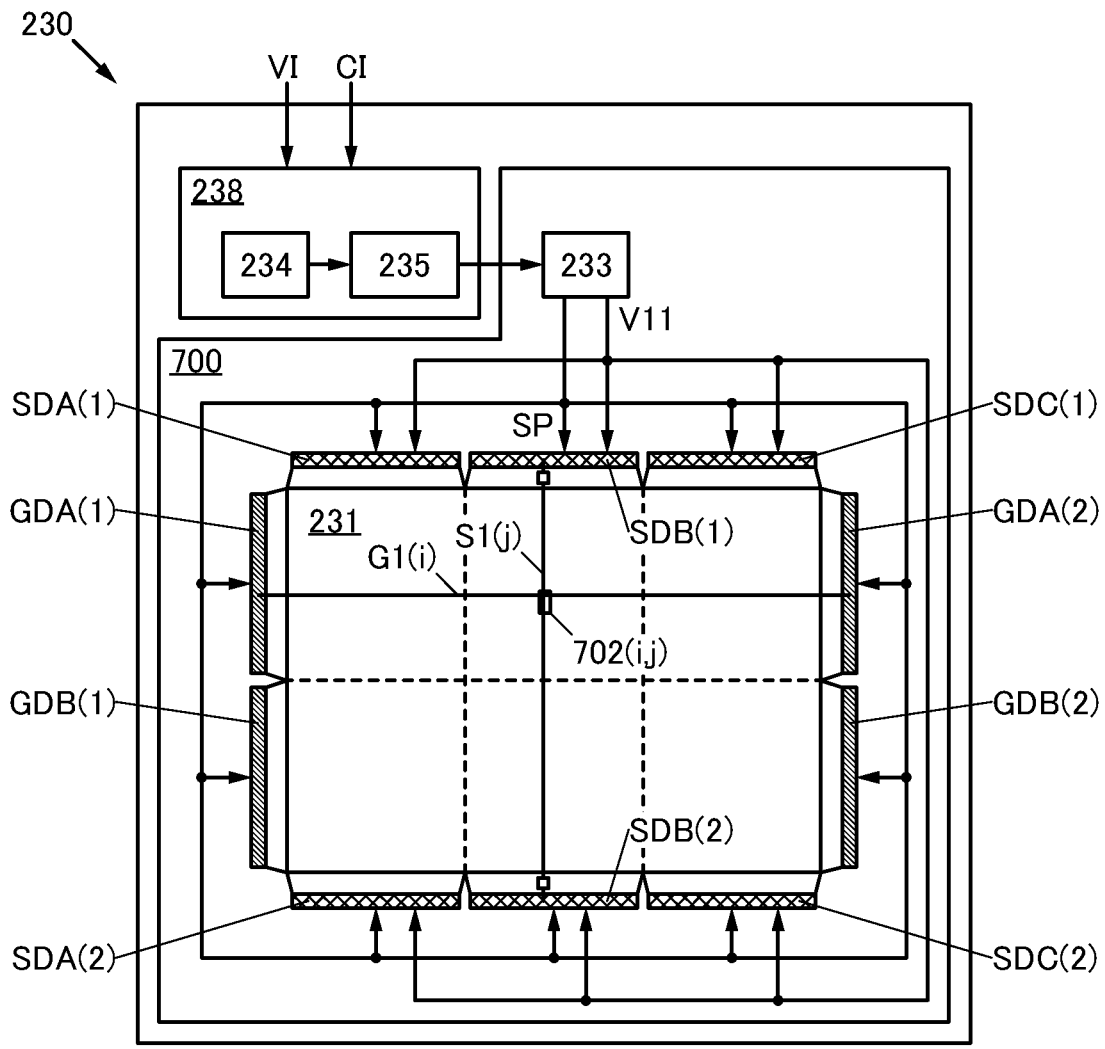
Figure 10A:
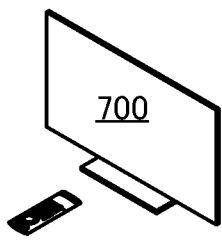
Figure 10A:
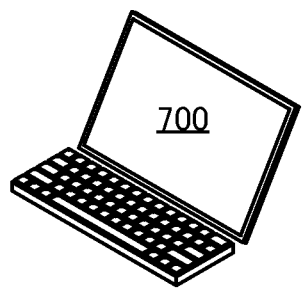
Figure 10A:
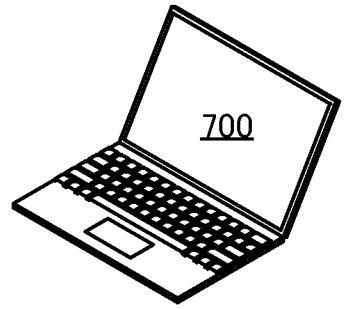

The display portion 230 described in this embodiment includes a control portion 238 and the display panel 700 (see FIG. 10A).

Structure Example 1 of Control Portion 238

The control portion 238 is supplied with image data VI and control data CI. For example, a clock signal, a timing signal, or the like can be used as the control data CI.

The control portion 238 generates the data V11 on the basis of the image data VI, and the control portion 238 generates the control signal SP on the basis of the control data CI.

The control portion 238 supplies the data V11 and the control signal SP through a control circuit 233.

The data V11 includes a grayscale of 8 bits or more, preferably 12 bits or more, for example. In addition, a clock signal, a start pulse, or the like of a shift register used for a driver circuit can be used as the control signal SP, for example.

Structure Example 2 of Control Portion 238

For example, a decompression circuit 234 and an image processing circuit 235 can be used in the control portion 238.

Decompression Circuit 234

The decompression circuit 234 has a function of decompressing the image data VI supplied in a compressed state. The decompression circuit 234 includes a memory portion. The memory portion has a function of storing decompressed image data, for example.

Image Processing Circuit 235

The image processing circuit 235 includes a memory region, for example. The memory region has a function of storing data included in the image data VI, for example.

The image processing circuit 235 has a function of generating the data V11 by correcting the image data VI on the basis of a predetermined characteristic curve and a function of supplying the data V11, for example.

Structure Example 1 of Display Panel 700

The display panel 700 includes the display region 231 and a driver circuit. For example, the display panel 700 of the input/output device described in Embodiment 2 can be used.

The display panel 700 is supplied with the data V11 and the control signal SP.

The driver circuit operates on the basis of the control signal SP. Using the control signal SP enables a synchronized operation of a plurality of driver circuits.

For example, a driver circuit GDA(1), a driver circuit GDA(2), a driver circuit GDB(1), and a driver circuit GDB(2) can be used in the display panel. The driver circuit GDA(1), the driver circuit GDA(2), the driver circuit GDB (1), and the driver circuit GDB(2) are supplied with the control signal SP and have a function of supplying a selection signal.

For example, a driver circuit SDA(1), a driver circuit SDA(2), a driver circuit SDB(1), a driver circuit SDB(2), a driver circuit SDC(1), and a driver circuit SDC(2) can be used in the display panel. The driver circuit SDA(1), the driver circuit SDA(2), the driver circuit SDB(1), the driver circuit SDB(2), the driver circuit SDC(1), and the driver circuit SDC(2) are supplied with the control signal SP and the data V11 and capable of supplying an image signal.

Structure Example of Pixel 702(i,j)

The pixel 702(i, j) performs display on the basis of the data V11.

Thus, the image data can be displayed using the liquid crystal element. As a result, a novel input/output device that is highly convenient or reliable can be provided. Alternatively, for example, a television receiver system (see FIG. 10B1), a video monitor (see FIG. 10B2), a laptop computer (see FIG. 10B3), or the like can be provided.

Structure Example 2 of Display Panel 700

For example, the control circuit 233 can be used in the display panel 700. Specifically, the control circuit 233 formed over a rigid substrate can be used for the display panel 700. The control circuit 233 formed over the rigid substrate can be electrically connected to the control portion 238 with the use of a flexible printed circuit.

Control Circuit 233

The control circuit 233 has a function of generating and supplying the control signal SP. For example, a clock signal, a timing signal, or the like can be used as the control signal SP. Specifically, a timing controller can be used as the control circuit 233.

Note that this embodiment can be combined with other embodiments in this specification as appropriate.

Embodiment 4

In this embodiment, structures of a data processing device of one embodiment of the present invention will be described with reference to FIG. 11 to FIG. 13.

Figure 11A:
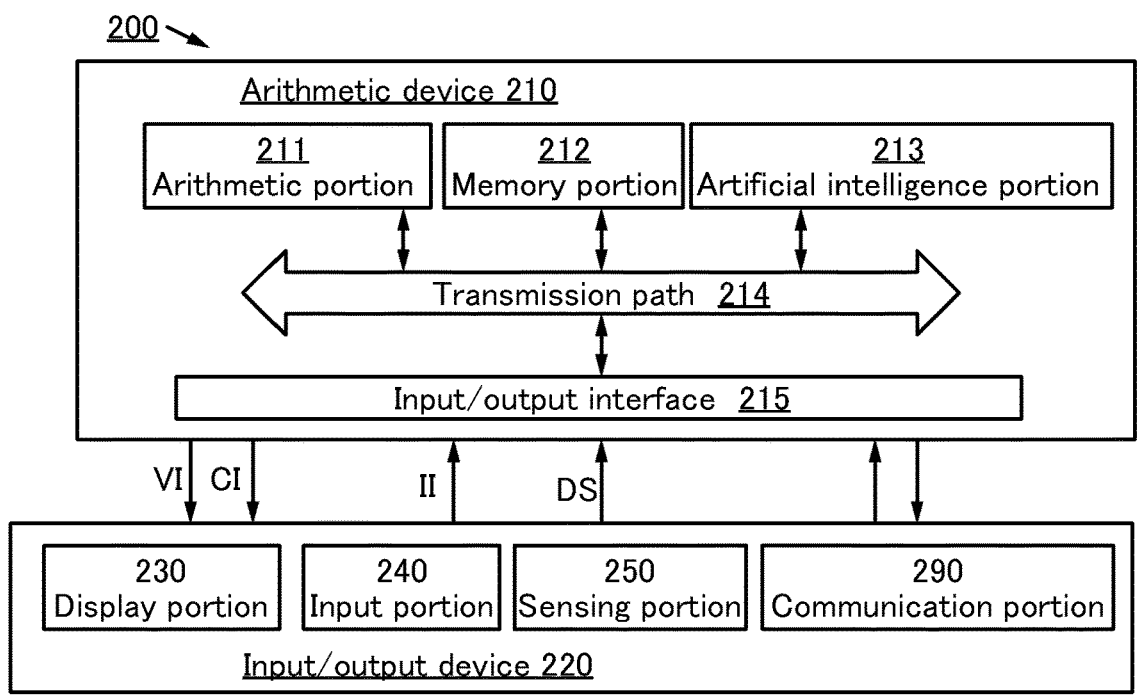
FIG. 11A to FIG. 11C are a block diagram and projection views illustrating structures of a data processing device of an embodiment.
Figure 11B:
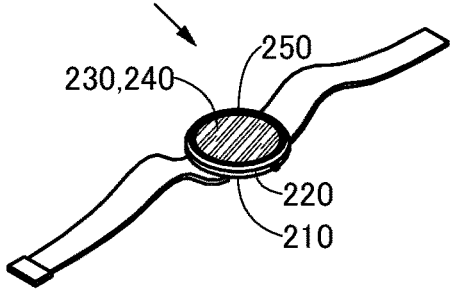
Figure 11C:
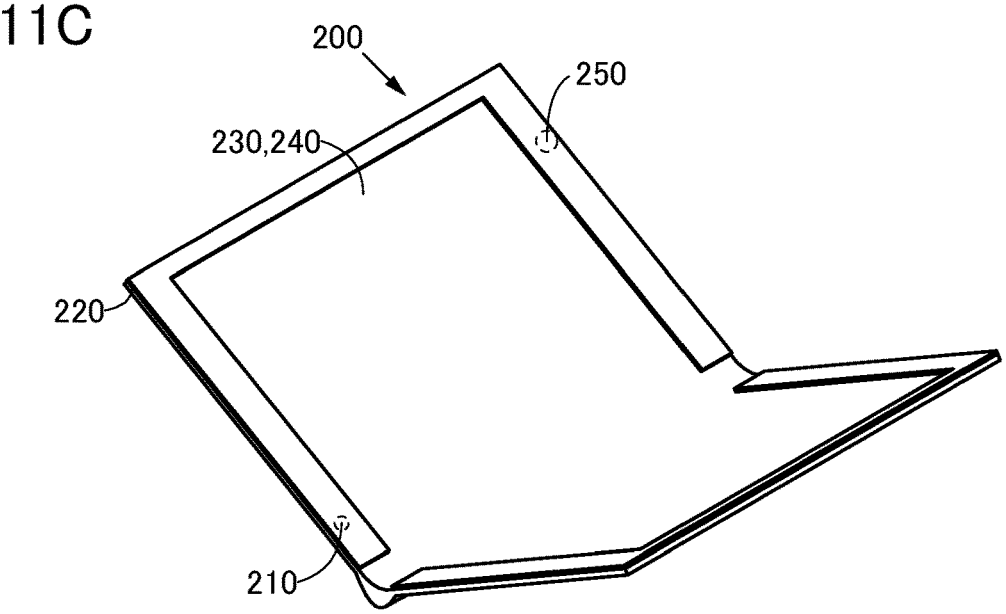

FIG. 11A is a block diagram illustrating the structure of the data processing device of one embodiment of the present invention. FIG. 11B and FIG. 11C are projection views illustrating examples of the appearance of the data processing device.

Figure 12A:
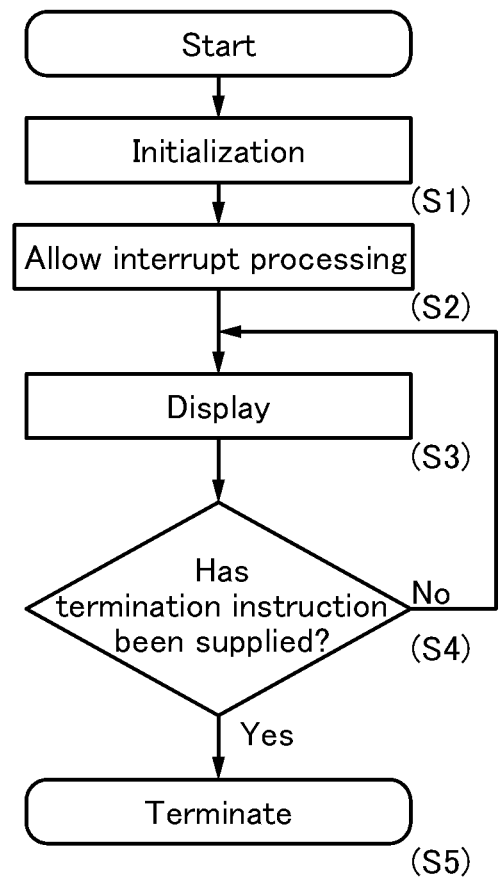
FIG. 12A and FIG. 12B are flow charts showing a method for driving a data processing device of an embodiment.
Figure 12B:
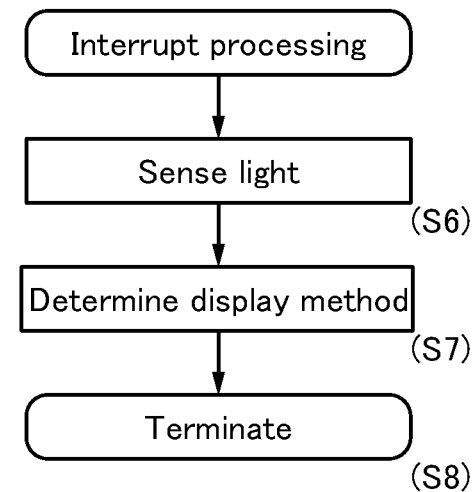

FIG. 12 is a flow chart showing a program of one embodiment of the present invention. FIG. 12A is a flow chart showing main processing of the program of one embodiment of the present invention, and FIG. 12B is a flow chart showing interrupt processing.

Figure 13A:
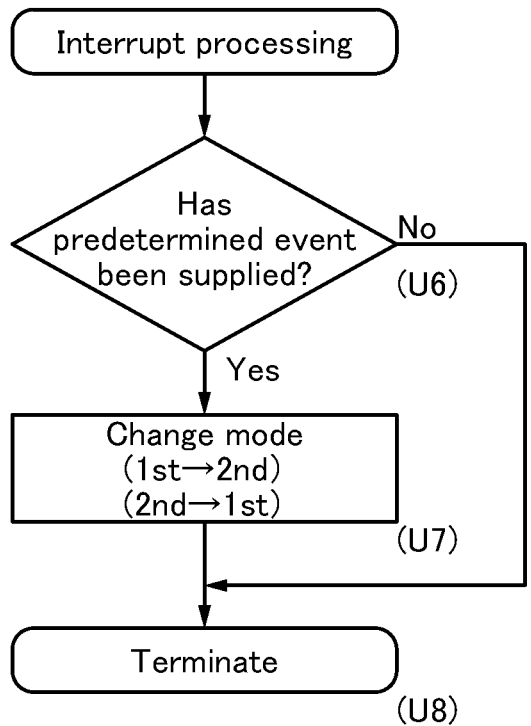
FIG. 13A to FIG. 13C are diagrams showing a method for driving a data processing device of an embodiment.
Figure 13B:
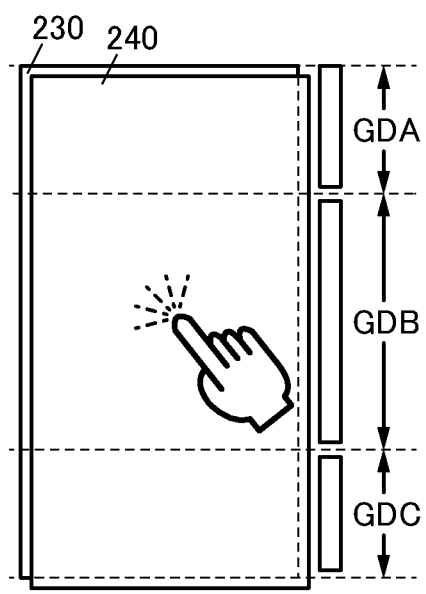
Figure 13C:
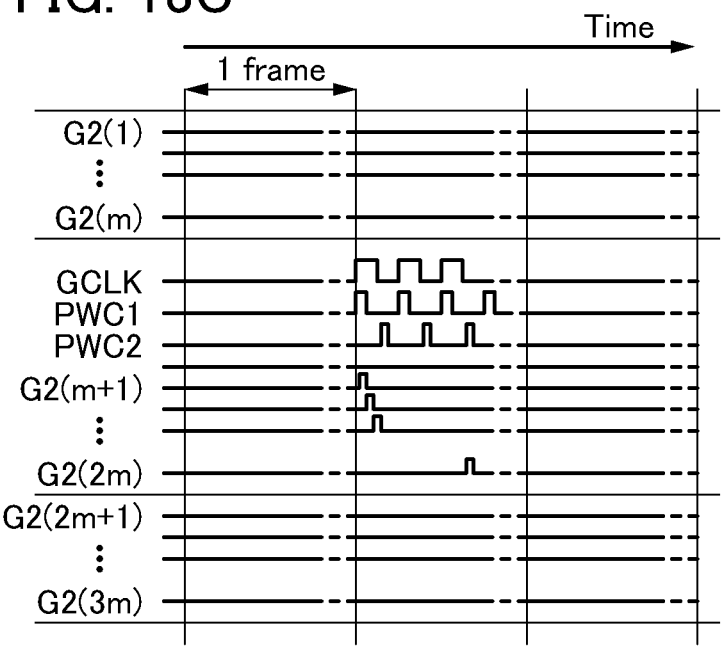

FIG. 13 is a diagram showing a program of one embodiment of the present invention. FIG. 13A is a flow chart showing interrupt processing of the program of one embodiment of the present invention. FIG. 13B is a schematic view illustrating operation of the data processing device, and FIG. 13C is a timing chart showing operation of the data processing device of one embodiment of the present invention.

Structure Example 1 of Data Processing Device

A data processing device described in this embodiment includes an input/output device 220 and an arithmetic device 210 (see FIG. 11A). Note that the input/output device 220 is electrically connected to the arithmetic device 210. A data processing device 200 can also include a housing (see FIG. 11B and FIG. 11C).

Structure Example of Input/Output Device 220

The input/output device 220 supplies sensing data DS and input data II (see FIG. 11A). The input/output device 220 includes a sensing portion 250. The input/output device 220 can also include a communication portion 290.

For example, the input/output device described in any of Embodiment 1 to Embodiment 3 can be used as the input/output device 220.

As the input data II, for example, a scan code of a keyboard, positional data, operation data of buttons, sound data, image data, or the like can be used. Alternatively, for example, illuminance data, attitude data, acceleration data, bearing data, pressure data, temperature data, humidity data, or the like of an environment where the data processing device 200 is used, or the like can be used as the sensing data DS.

As the control data CI, for example, a signal controlling the luminance of display of the image data VI, a signal controlling the color saturation, or a signal controlling the hue can be used. Alternatively, a signal that changes display of part of the image data VI can be used as the control data CI.

Structure Example of Sensing Portion 250

The sensing portion 250 generates the sensing data DS. The sensing portion 250 has a function of sensing the illuminance of the environment where the data processing device 200 is used and a function of supplying illuminance data, for example.

The sensing portion 250 has a function of sensing the ambient conditions and supplying the sensing data. Specifically, the sensing portion 250 can supply illuminance data, attitude data, acceleration data, bearing data, pressure data, temperature data, humidity data, or the like.

For example, a photosensor, an attitude sensor, an acceleration sensor, a direction sensor, a GPS (Global positioning System) signal receiving circuit, a pressure-sensitive switch, a pressure sensor, a temperature sensor, a humidity sensor, a camera, or the like can be used as the sensing portion 250.

Structure Example of Input Portion 240

The input portion 240 generates the input data II. For example, the input portion 240 has a function of supplying positional data.

For example, a human interface or the like can be used for the input portion 240 (see FIG. 11A). Specifically, a keyboard, a mouse, a touch sensor, a microphone, a camera, or the like can be used as the input portion 240.

Moreover, a touch sensor including a region overlapping with the display portion 230 can be used. Note that an input/output device including the display portion 230 and a touch sensor including a region overlapping with the display portion 230 can be referred to as a touch panel or a touch screen.

A user can make various gestures (tap, drag, swipe, pinch in, and the like) using his/her finger touching the touch panel as a pointer, for example.

The arithmetic device 210, for example, analyzes data on the position, path, or the like of the finger in contact with the touch panel and can determine that a predetermined gesture is supplied when the analysis results meet predetermined conditions. Thus, the user can supply a predetermined operation instruction associated with the predetermined gesture in advance by using the gesture.

For instance, the user can supply a "scroll instruction" for changing the display position of image data by using a gesture of moving the finger in contact with the touch panel along the touch panel.

Communication Portion 290

The communication portion 290 has a function of supplying data to a network and obtaining data from the network.

Housing

Note that the housing has a function of storing the input/output device 220 or the arithmetic device 210. Alternatively, the housing has a function of supporting the display portion 230 or the arithmetic device 210.

Structure Example 1 of Arithmetic Device 210

The arithmetic device 210 is supplied with the input data II or the sensing data DS.

The arithmetic device 210 generates the control data CI and the image data VI on the basis of the input data II or the sensing data DS, and the arithmetic device 210 supplies the control data CI and the image data VI.

The arithmetic device 210 includes an arithmetic portion 211, a memory portion 212, and an artificial intelligence portion 213. The arithmetic device 210 includes a transmission path 214 and an input/output interface 215.

The transmission path 214 is electrically connected to the arithmetic portion 211, the memory portion 212, the artificial intelligence portion 213, and the input/output interface 215.

Arithmetic Portion 211

The arithmetic portion 211 has a function of executing a program, for example.

Memory Portion 212

The memory portion 212 has a function of storing, for example, the program executed by the arithmetic portion 211, initial data, setting data, an image, or the like.

Specifically, a hard disk, a flash memory, a memory using a transistor including an oxide semiconductor, or the like can be used.

Input/Output Interface 215 and Transmission Path 214

The input/output interface 215 includes a terminal or a wiring and has a function of supplying data and being supplied with data. The input/output interface 215 can be electrically connected to the transmission path 214, for example. The input/output interface 215 can also be electrically connected to the input/output device 220.

The transmission path 214 includes a wiring and has a function of supplying data and being supplied with data. The transmission path 214 can be electrically connected to the input/output interface 215, for example. The transmission path 214 can also be electrically connected to the arithmetic portion 211, the memory portion 212, or the input/output interface 215.

Thus, the control data CI can be generated on the basis of the input data II or the sensing data DS. Alternatively, the image data VI can be displayed on the basis of the input data II or the sensing data DS. Alternatively, the data processing device can determine the intensity of light received by the housing of the data processing device and operate under the environment where the data processing device is used. Alternatively, a user of the data processing device can select a display method. As a result, a novel data processing device that is highly convenient or reliable can be provided.

Structure Example 2 of Arithmetic Device 210

The arithmetic device 210 includes the artificial intelligence portion 213 (see FIG. 11A).

The artificial intelligence portion 213 is supplied with the input data II or the sensing data DS, and the artificial intelligence portion 213 infers the control data CI on the basis of the input data II or the sensing data DS.

In this manner, the control data CI for display that can be felt suitable can be generated. Alternatively, display that can be felt suitable is possible. Alternatively, the control data CI for display that can be felt comfortable can be generated. Alternatively, display that can be felt comfortable is possible. As a result, a novel data processing device that is highly convenient or reliable can be provided.

Natural Language Processing on Input Data II

Specifically, the artificial intelligence portion 213 can perform natural language processing on the input data II to extract one feature from the whole input data II. For example, the artificial intelligence portion 213 can infer emotion or the like put in the input data II, which can be a feature. The artificial intelligence portion 213 can infer the color, design, font, or the like empirically felt suitable for the feature. The artificial intelligence portion 213 can generate data specifying the color, design, or font of a letter or data specifying the color or design of the background, and the data can be used as the control data CI.

Specifically, the artificial intelligence portion 213 can perform natural language processing on the input data II to extract some words included in the input data II. For example, the artificial intelligence portion 213 can extract expressions including a grammatical error, a factual error, emotion, and the like. The artificial intelligence portion 213 can generate data for display of extracted part in the color, design, font, or the like different from those of another part, and the data can be used as the control data CI.

Image Processing on Input Data II

Specifically, the artificial intelligence portion 213 can perform image processing on the input data II to extract one feature from the input data II. For example, the artificial intelligence portion 213 can infer the age where an image of the input data II is taken, whether the image is taken indoors or outdoors, whether the image is taken in the daytime or at night, or the like, which can be a feature. The artificial intelligence portion 213 can infer the color tone empirically felt suitable for the feature and generate the control data CI for use of the color tone for display. Specifically, data specifying color (e.g., full color, monochrome, or sepia) used for expression of a gradation can be used as the control data CI.

Specifically, the artificial intelligence portion 213 can perform image processing on the input data II to extract some images included in the input data II. For example, the artificial intelligence portion 213 can generate the control data CI for display of a boundary between extracted part of the image and another part. Specifically, the artificial intelligence portion 213 can generate the control data CI for display of a rectangle surrounding the extracted part of the image.

Inference Using Sensing Data DS

Specifically, the artificial intelligence portion 213 can generate an inference using the sensing data DS. Alternatively, the artificial intelligence portion 213 can generate the control data CI on the basis of the inference so that the user of the data processing device 200 can feel comfortable.

Specifically, the artificial intelligence portion 213 can generate the control data CI for adjustment of display brightness on the basis of the ambient illuminance or the like so that the display brightness can be felt comfortable. Alternatively, the artificial intelligence portion 213 can generate the control data CI for adjustment of volume on the basis of the ambient noise or the like so that the volume can be felt comfortable.

As the control data CI, a clock signal, a timing signal, or the like that is supplied to the control portion 238 included in the display portion 230 can be used. Alternatively, a clock signal, a timing signal, or the like that is supplied to a control portion included in the input portion 240 can be used as the control data CI.

Structure Example 2 of Data Processing Device

Another structure of the data processing device of one embodiment of the present invention is described with reference to FIG. 12A and FIG. 12B.

Program

A program of one embodiment of the present invention has the following steps (see FIG. 12A).

First Step

In a first step, setting is initialized (see (S1) in FIG. 12A).

For example, predetermined image data which is to be displayed on start-up and data for determining a predetermined mode of displaying the image data and a predetermined display method for displaying the image data are acquired from the memory portion 212. Specifically, one still image data or another moving image data can be used as the predetermined image data. Furthermore, a first mode or a second mode can be used as the predetermined mode.

Second Step

In a second step, interrupt processing is allowed (see (S2) in FIG. 12A). Note that an arithmetic device allowed to execute the interrupt processing can perform the interrupt processing in parallel with the main processing. The arithmetic device that has returned from the interrupt processing to the main processing can reflect the results obtained through the interrupt processing in the main processing.

The arithmetic device may execute the interrupt processing when a counter has an initial value, and the counter may be set at a value other than the initial value when the arithmetic device returns from the interrupt processing. Thus, the interrupt processing can always follow the start-up of the program.

Third Step

In a third step, image data is displayed by a predetermined mode or a predetermined display method selected in the first step or the interrupt processing (see (S3) in FIG. 12A). Note that the predetermined mode determines a mode of displaying the data, and the predetermined display method determines a method for displaying the image data. For example, the image data VI can be used as data to be displayed.

One method for displaying the image data VI can be associated with the first mode, for example. Alternatively, another method for displaying the image data VI can be associated with the second mode. Thus, a display method can be selected on the basis of the selected mode.

First Mode

Specifically, a method for supplying selection signals to a scan line at a frequency of 30 Hz or higher, preferably 60 Hz or higher, and performing display on the basis of the selection signals can be associated with the first mode.

For example, when selection signals are supplied at a frequency of 30 Hz or higher, preferably 60 Hz or higher, the movement of a moving image can be smoothly displayed.

For example, when an image is refreshed at a frequency of 30 Hz or higher, preferably 60 Hz or higher, an image that changes so as to smoothly follow the user's operation can be displayed on the data processing device 200 which is being operated by the user.

Second Mode

Specifically, a method for supplying selection signals to a scan line at a frequency lower than 30 Hz, preferably lower than 1 Hz, further preferably less than once a minute, and performing display on the basis of the selection signals can be associated with the second mode.

The supply of selection signals at a frequency lower than 30 Hz, preferably lower than 1 Hz, further preferably less than once a minute enables display with a flicker or flickering suppressed. Furthermore, the power consumption can be reduced.

For example, when the data processing device 200 is used for a clock, the display can be refreshed at a frequency of once a second, once a minute, or the like.

Fourth Step

In a fourth step, selection is performed such that the program proceeds to a fifth step when a termination instruction has been supplied, whereas the program proceeds to the third step when the termination instruction has not been supplied (see (S4) in FIG. 12A).

For example, the termination instruction supplied in the interrupt processing may be used for the determination.

Fifth Step

In the fifth step, the program terminates (see (S5) in FIG. 12A).

Interrupt Processing

The interrupt processing includes a sixth step to an eighth step described below (see FIG. 12B).

Sixth Step

In the sixth step, the illuminance of the environment where the data processing device 200 is used is sensed using the sensing portion 250, for example (see (S6) in FIG. 12B). Note that color temperature or chromaticity of ambient light may be sensed instead of the illuminance of the environment.

Seventh Step

In the seventh step, a display method is determined on the basis of the sensed illuminance data (see (S7) in FIG. 12B). For example, a display method is determined such that the brightness of display is not too dark or too bright.

Note that in the case where the color temperature of the ambient light or the chromaticity of the ambient light is sensed in the sixth step, the color of display may be adjusted.

Eighth Step

In the eighth step, the interrupt processing terminates (see (S8) in FIG. 12B).

Structure Example 3 of Data Processing Device

Another structure of the data processing device of one embodiment of the present invention is described with reference to FIG. 13.

FIG. 13A is a flow chart showing a program of one embodiment of the present invention. FIG. 13A is a flow chart showing interrupt processing different from the interrupt processing shown in FIG. 12B.

Note that the structure example 3 of the data processing device is different from the interrupt processing described with reference to FIG. 12B in that the interrupt processing includes a step of changing a mode on the basis of a supplied predetermined event. Different portions will be described in detail here, and refer to the above description for portions that can use similar structures.

Interrupt Processing

The interrupt processing includes a sixth step to an eighth step described below (see FIG. 13A).

Sixth Step

In the sixth step, the program proceeds to the seventh step when a predetermined event has been supplied, whereas the program proceeds to the eighth step when the predetermined event has not been supplied (see (U6) in FIG. 13A). For example, whether the predetermined event is supplied in a predetermined period or not can be used as a condition. Specifically, the predetermined period can be longer than 0 seconds, and shorter than or equal to 5 seconds, shorter than or equal to 1 second, or shorter than or equal to 0.5 seconds, preferably shorter than or equal to 0.1 seconds.

Seventh Step

In the seventh step, the mode is changed (see (U7) in FIG. 13A). Specifically, the second mode is selected in the case where the first mode has been selected, and the first mode is selected in the case where the second mode has been selected.

For example, it is possible to change the display mode of a region that is part of the display portion 230. Specifically, the display mode of a region where one driver circuit in the display portion 230 including the driver circuit GDA, the driver circuit GDB, and a driver circuit GDC supplies a selection signal can be changed (see FIG. 13B).

For example, the display mode of the region where a selection signal is supplied from the driver circuit GDB can be changed when a predetermined event is supplied to the input portion 240 in a region overlapping with the region where a selection signal is supplied from the driver circuit GDB (see FIG. 13B and FIG. 13C). Specifically, the frequency of supply of the selection signal from the driver circuit GDB can be changed in accordance with a "tap" event supplied to a touch panel with a finger or the like.

A signal GCLK is a clock signal controlling the operation of the driver circuit GDB, and a signal PWC1 and a signal PWC2 are pulse width control signals controlling the operation of the driver circuit GDB. The driver circuit GDB supplies selection signals to a scan line G2($m$+1) to a scan line G2($2m$) on the basis of the signal GCLK, the signal PWC1, the signal PWC2, and the like.

Thus, for example, the driver circuit GDB can supply a selection signal without supply of selection signals from the driver circuit GDA and the driver circuit GDC. Alternatively, the display of the region where a selection signal is supplied from the driver circuit GDB can be refreshed without any change in the display of regions where selection signals are supplied from the driver circuit GDA and the driver circuit GDC. Alternatively, power consumed by the driver circuits can be reduced.

Eighth Step

In the eighth step, the interrupt processing terminates (see (U8) in FIG. 13A). Note that in a period in which the main processing is executed, the interrupt processing may be repeatedly executed.

Predetermined Event

For example, it is possible to use events supplied using a pointing device such as a mouse, such as "click" and "drag", and events supplied to a touch panel with a finger or the like used as a pointer, such as "tap", "drag", and "swipe".

For example, the position of a slide bar pointed by a pointer, the swipe speed, and the drag speed can be used to assign arguments to an instruction associated with a predetermined event.

For example, data sensed by the sensing portion 250 is compared with a predetermined threshold value, and the compared results can be used for the event.

Specifically, a pressure sensor or the like in contact with a button or the like that is provided so as to be pushed in a housing can be used for the sensing portion 250.

Instruction Associated with Predetermined Event

For example, the termination instruction can be associated with a predetermined event.

For example, "page-turning instruction" for switching display from one displayed image data to another image data can be associated with a predetermined event. Note that an argument determining the page-turning speed or the like, which is used when the "page-turning instruction" is executed, can be supplied using the predetermined event.

For example, "scroll instruction" for moving the display position of displayed part of image data and displaying another part continuing from that part, or the like can be associated with a predetermined event. Note that an argument determining the moving speed of display, or the like, which is used when the "scroll instruction" is executed, can be supplied using the predetermined event.

For example, an instruction for setting the display method, an instruction for generating image data, or the like can be associated with a predetermined event. Note that an argument determining the brightness of a generated image can be associated with a predetermined event. An argument determining the brightness of a generated image may be determined on the basis of ambient brightness sensed by the sensing portion 250.

For example, an instruction for acquiring data distributed via a push service using the communication portion 290 or the like can be associated with a predetermined event.

Note that positional data sensed by the sensing portion 250 may be used for the determination of the presence or absence of a qualification for acquiring data. Specifically, it may be determined that there is a qualification for acquiring data in the case of presence in a predetermined classroom, school, conference room, company, building, or the like or in a predetermined region. Thus, for example, educational materials distributed in a classroom of a school, a university, or the like can be received, so that the data processing device 200 can be used as a schoolbook or the like (see FIG. 11C). Alternatively, materials distributed in a conference room in, for example, a company can be received and used for a conference material.

Note that this embodiment can be combined with other embodiments in this specification as appropriate.

Embodiment 5

In this embodiment, a structure of a data processing device of one embodiment of the present invention will be described with reference to FIG. 14 to FIG. 16.

Figure 14A:
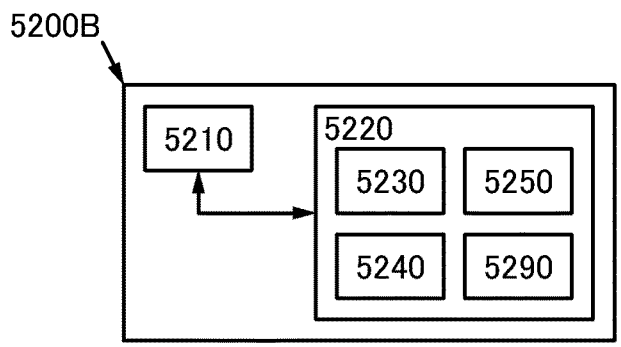
FIG. 14A to FIG. 14E are diagrams each illustrating a structure of a data processing device of an embodiment.
Figure 14B:
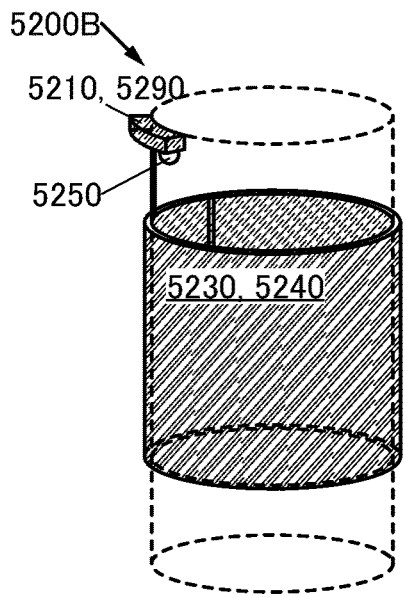
Figure 14C:
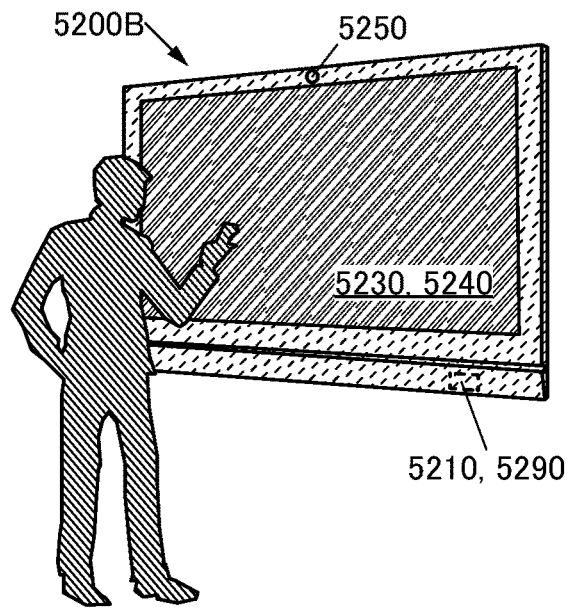
Figure 14D:
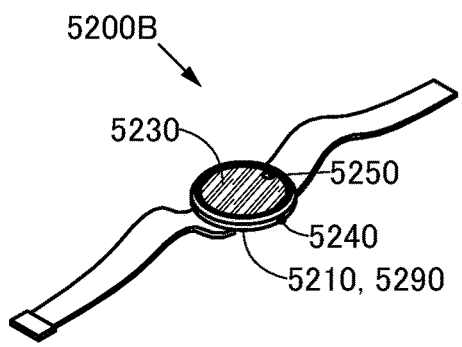
Figure 14E:
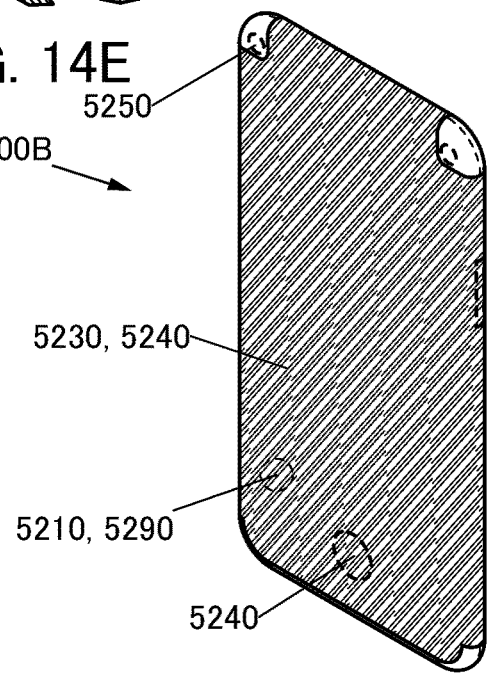
Figure 15A:
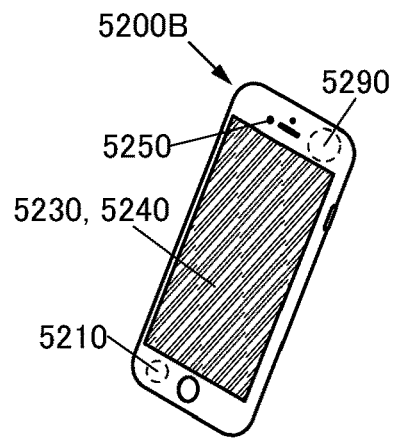
FIG. 15A to FIG. 15E are diagrams each illustrating a structure of a data processing device of an embodiment.
Figure 15B:
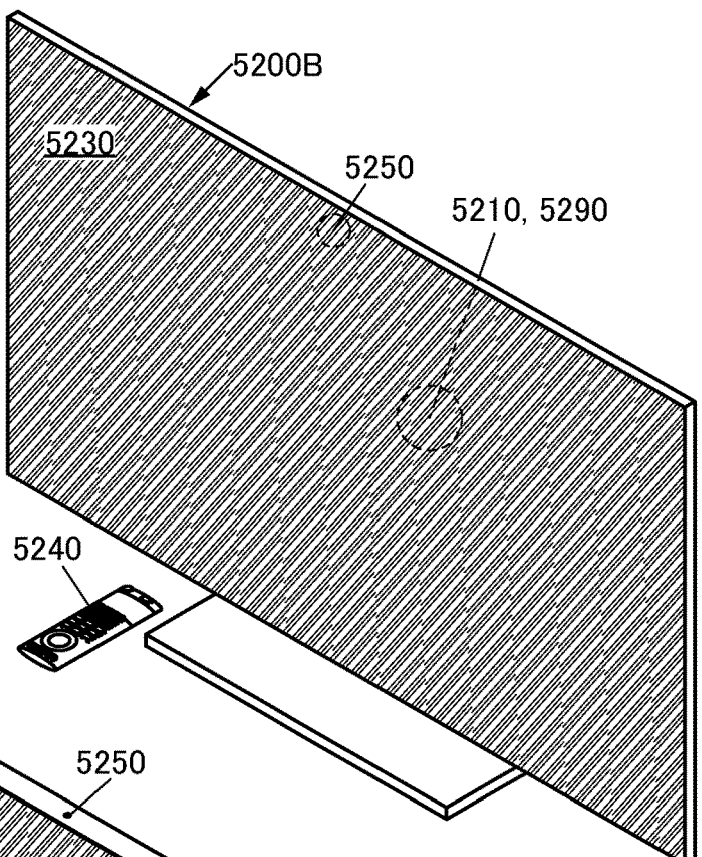
Figure 15C:
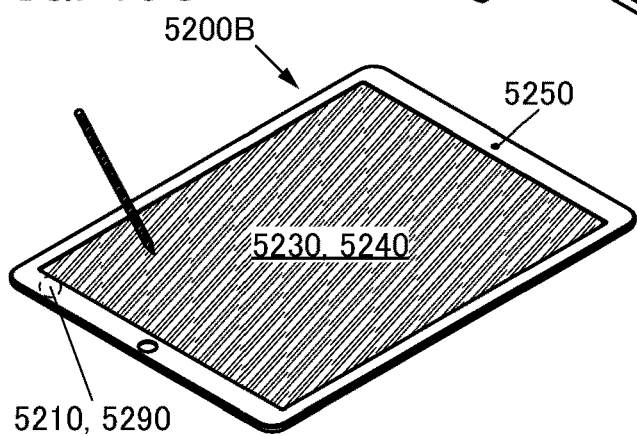
Figure 15D:
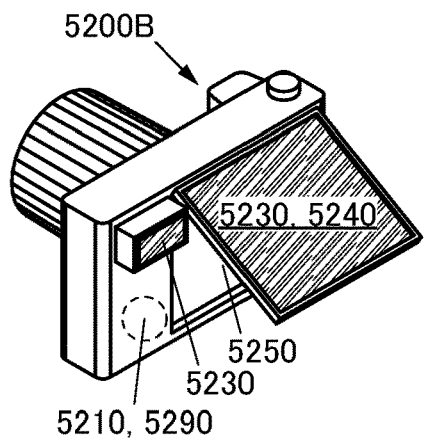
Figure 15E:
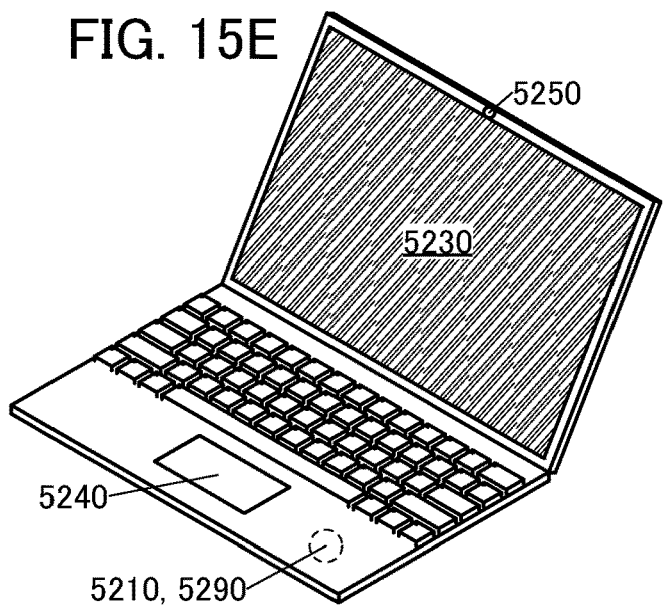
Figure 16A:
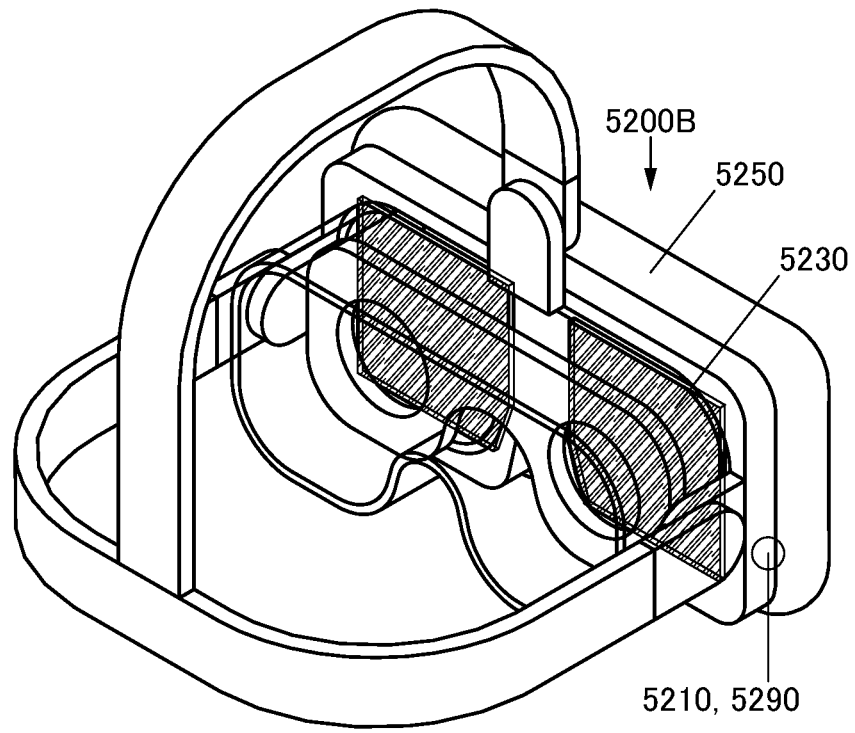
FIG. 16A and FIG. 16B are diagrams each illustrating a structure of a data processing device of an embodiment.
Figure 16B:
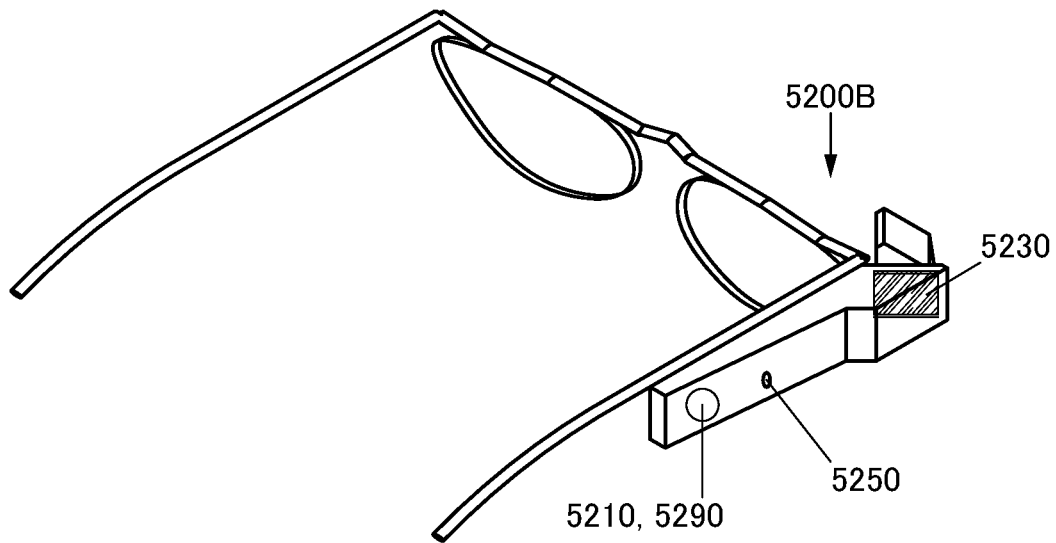

FIG. 14 to FIG. 16 are diagrams illustrating structures of the data processing device of one embodiment of the present invention. FIG. 14A is a block diagram of the data processing device, and FIG. 14B to FIG. 14E are perspective views illustrating structures of the data processing device. In addition, FIG. 15A to FIG. 15E are perspective views illustrating structures of the data processing device. In addition, FIG. 16A and FIG. 16B are perspective views illustrating structures of the data processing device.

Data Processing Device

A data processing device 5200B described in this embodiment includes an arithmetic device 5210 and an input/output device 5220 (see FIG. 14A).

The arithmetic device 5210 has a function of being supplied with operation data and a function of supplying image data on the basis of the operation data.

The input/output device 5220 includes a display portion 5230, an input portion 5240, a sensing portion 5250, and a communication portion 5290 and has a function of supplying operation data and a function of being supplied with image data. The input/output device 5220 has a function of supplying sensing data, a function of supplying communication data, and a function of being supplied with communication data. For example, the input/output device described in Embodiment 1 to Embodiment 3 can be used as the input/output device 5220.

The input portion 5240 has a function of supplying operation data. For example, the input portion 5240 supplies operation data on the basis of operation by a user of the data processing device 5200B.

Specifically, a keyboard, a hardware button, a pointing device, a touch sensor, an illuminance sensor, an imaging device, an audio input device, an eye-gaze input device, an attitude detection device, or the like can be used as the input portion 5240.

The display portion 5230 includes a display panel and has a function of displaying image data.

The sensing portion 5250 has a function of supplying sensing data. For example, the sensing portion 5250 has a function of sensing a surrounding environment where the data processing device is used and supplying sensing data.

Specifically, an illuminance sensor, an imaging device, an attitude detection device, a pressure sensor, a human motion sensor, or the like can be used as the sensing portion 5250.

The communication portion 5290 has a function of being supplied with communication data and a function of supplying communication data. For example, the communication portion 5290 has a function of being connected to another electronic device or a communication network through wireless communication or wired communication. Specifically, the communication portion 5290 has a function of wireless local area network communication, telephone communication, near field communication, or the like.

Structure Example 1 of Data Processing Device

For example, the display portion 5230 can have an outer shape along a cylindrical column or the like (see FIG. 14B). In addition, the data processing device has a function of changing its display method in accordance with the illuminance of a usage environment. Furthermore, the data processing device has a function of changing displayed content in response to sensed existence of a person. This allows the data processing device to be provided on a column of a building, for example. The data processing device can display advertising, guidance, or the like. The data processing device can be used for digital signage or the like.

Structure Example 2 of Data Processing Device

For example, the data processing device has a function of generating image data on the basis of the path of a pointer used by a user (see FIG. 14C). Specifically, the display panel with a diagonal size of 20 inches or longer, preferably 40 inches or longer, further preferably 55 inches or longer can be used. Alternatively, a plurality of display panels can be arranged and used as one display region. Alternatively, a plurality of display panels can be arranged and used as a multiscreen. Thus, the data processing device can be used for an electronic blackboard, an electronic bulletin board, digital signage, or the like, for example.

Structure Example 3 of Data Processing Device

The data processing device can receive data from another device, and the data can be displayed on the display portion 5230 (see FIG. 14D). Moreover, several options can be displayed. The user can choose some from the options and send a reply to a transmitter of the data. For example, the data processing device has a function of changing its display method in accordance with the illuminance of a usage environment. Thus, for example, the power consumption of a smartwatch can be reduced. Alternatively, for example, a smartwatch can display an image so as to be suitably used even in an environment under strong external light, e.g., outdoors in fine weather.

Structure Example 4 of Data Processing Device

For example, the display portion 5230 has a surface gently curved along a side surface of a housing (see FIG. 14E). The display portion 5230 includes a display panel, and the display panel has a function of performing display on the front surface, the side surfaces, the top surface, and the rear surface, for example. Thus, for example, a mobile phone can display data not only on its front surface but also on its side surfaces, its top surface, and its rear surface.

Structure Example 5 of Data Processing Device

For example, the data processing device can receive data via the Internet and display the data on the display portion 5230 (see FIG. 15A). A created message can be checked on the display portion 5230. The created message can be sent to another device. For example, the data processing device has a function of changing its display method in accordance with the illuminance of a usage environment. Thus, the power consumption of a smartphone can be reduced. Alternatively, for example, a smartphone can display an image so as to be suitably used even in an environment under strong external light, e.g., outdoors in fine weather.

Structure Example 6 of Data Processing Device

A remote controller can be used as the input portion 5240 (see FIG. 15B). For example, the data processing device can receive data from a broadcast station or via the Internet and display the data on the display portion 5230. An image of a user can be captured using the sensing portion 5250. The image of the user can be transmitted. The data processing device can acquire a viewing history of the user and provide it to a cloud service. The data processing device can acquire recommendation data from a cloud service and display the data on the display portion 5230. A program or a moving image can be displayed on the basis of the recommendation data. For example, the data processing device has a function of changing its display method in accordance with the illuminance of a usage environment. Accordingly, a television system can display an image to be suitably used even when irradiated with strong external light that enters a room in fine weather.

Structure Example 7 of Data Processing Device

For example, the data processing device can receive educational materials via the Internet and display them on the display portion 5230 (see FIG. 15C). An assignment can be input with the input portion 5240 and sent via the Internet. A corrected assignment or the evaluation of the assignment can be obtained from a cloud service and displayed on the display portion 5230. Suitable educational materials can be selected on the basis of the evaluation and displayed.

For example, the display portion 5230 can perform display using an image signal received from another data processing device. When the data processing device is placed on a stand or the like, the display portion 5230 can be used as a sub-display. Thus, for example, a tablet computer can display an image to be suitably used even in an environment under strong external light, e.g., outdoors in fine weather.

Structure Example 8 of Data Processing Device

The data processing device includes, for example, a plurality of display portions 5230 (see FIG. 15D). For example, the display portion 5230 can display an image that the sensing portion 5250 is capturing. A captured image can be displayed on the sensing portion 5250. A captured image can be decorated using the input portion 5240. A message can be attached to a captured image. A captured image can be transmitted via the Internet. The data processing device has a function of changing its shooting conditions in accordance with the illuminance of a usage environment. Accordingly, for example, a digital camera can display a subject in such a manner that an image is suitably viewed even in an environment under strong external light, e.g., outdoors in fine weather.

Structure Example 9 of Data Processing Device

For example, the data processing device of this embodiment is used as a master and another data processing device is used as a slave, whereby the other data processing device can be controlled (see FIG. 15E). As another example, part of image data can be displayed on the display portion 5230 and another part of the image data can be displayed on a display portion of another data processing device. In addition, image signals can be supplied. With the communication portion 5290, data to be written can be obtained from an input portion of another data processing device. Thus, a large display region can be utilized by using a portable personal computer, for example.

Structure Example 10 of Data Processing Device

The data processing device includes, for example, the sensing portion 5250 that senses an acceleration or a direction (see FIG. 16A). The sensing portion 5250 can supply data on the position of the user or the direction in which the user faces. The data processing device can generate image data for the right eye and image data for the left eye in accordance with the position of the user or the direction in which the user faces. The display portion 5230 includes a display region for the right eye and a display region for the left eye. Thus, a virtual reality image that gives the user a sense of immersion can be displayed on a goggles-type data processing device, for example.

Structure Example 11 of Data Processing Device

The data processing device includes, for example, an imaging device and the sensing portion 5250 that senses an acceleration or a direction (see FIG. 16B). The sensing portion 5250 can supply data on the position of the user or the direction in which the user faces. The data processing device can generate image data in accordance with the position of the user or the direction in which the user faces. Accordingly, the data can be superimposed on a real-world scene, for example. An augmented reality image can be displayed on a glasses-type data processing device.

Note that this embodiment can be combined with other embodiments in this specification as appropriate.

In the case where there is an explicit description, X and Y are connected, in this specification and the like, for example, the case where X and Y are electrically connected, the case where X and Y are functionally connected, and the case where X and Y are directly connected are disclosed in this specification and the like. Accordingly, without being limited to a predetermined connection relationship, for example, a connection relationship shown in drawings or texts, a connection relationship other than one shown in drawings or texts is regarded as being disclosed in the drawings or the texts.

Here, X and Y each denote an object (e.g., a device, an element, a circuit, a wiring, an electrode, a terminal, a conductive film, or a layer).

Examples of the case where X and Y are directly connected include the case where an element that allows an electrical connection between X and Y (e.g., a switch, a transistor, a capacitor, an inductor, a resistor, a diode, a display element, a light-emitting element, and a load) is not connected between X and Y, and the case where X and Y are connected without the element that allows the electrical connection between X and Y (e.g., a switch, a transistor, a capacitor, an inductor, a resistor, a diode, a display element, a light-emitting element, and a load) provided therebetween.

For example, in the case where X and Y are electrically connected, one or more elements that allow an electrical connection between X and Y (e.g., a switch, a transistor, a capacitor, an inductor, a resistor, a diode, a display element, a light-emitting element, and a load) can be connected between X and Y. Note that a switch has a function of being controlled to be turned on or off. That is, a switch has a function of being in a conduction state (on state) or a non-conduction state (off state) to control whether or not current flows. Alternatively, the switch has a function of selecting and changing a current path. Note that the case where X and Y are electrically connected includes the case where X and Y are directly connected.

An example of the case where X and Y are functionally connected is the case where one or more circuits that allow functional connection between X and Y (for example, a logic circuit (an inverter, a NAND circuit, a NOR circuit, or the like), a signal converter circuit (a DA converter circuit, an AD converter circuit, a gamma correction circuit, or the like), a potential level converter circuit (a power supply circuit (for example, a step-up circuit, a step-down circuit, or the like), a level shifter circuit for changing the potential level of a signal, or the like), a voltage source, a current source, a switching circuit, an amplifier circuit (a circuit capable of increasing signal amplitude, the amount of current, or the like, an operational amplifier, a differential amplifier circuit, a source follower circuit, a buffer circuit, or the like), a signal generator circuit, a memory circuit, a control circuit, or the like) can be connected between X and Y. For example, even when another circuit is interposed between X and Y, X and Y are functionally connected when a signal output from X is transmitted to Y. Note that the case where X and Y are functionally connected includes the case where X and Y are directly connected and the case where X and Y are electrically connected.

Note that in the case where there is an explicit description, X and Y are electrically connected, the case where X and Y are electrically connected (i.e., the case where X and Y are connected with another element or another circuit provided therebetween), the case where X and Y are functionally connected (i.e., the case where X and Y are functionally connected with another circuit provided therebetween), and the case where X and Y are directly connected (i.e., the case where X and Y are connected without another element or another circuit provided therebetween) are disclosed in this specification and the like. That is, in the case where there is an explicit description, being electrically connected, the same contents as the case where there is only an explicit description, being connected, are disclosed in this specification and the like.

Note that, for example, the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y can be expressed as follows.

It can be expressed as, for example, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order". Alternatively, the expression "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order" can be used. Alternatively, the expression "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided in this connection order" can be used. When the connection order in a circuit structure is defined by an expression similar to the above examples, a source (or a first terminal or the like) and a drain (or a second terminal or the like) of a transistor can be distinguished from each other to specify the technical scope.

Alternatively, as another expression, the expression "a source (or a first terminal or the like) of a transistor is electrically connected to X through at least a first connection path, the first connection path does not include a second connection path, the second connection path is a path through the transistor and between the source (or the first terminal or the like) of the transistor and a drain (or a second terminal or the like) of the transistor, the first connection path is a path through Z1, the drain (or the second terminal or the like) of the transistor is electrically connected to Y through at least a third connection path, the third connection path does not include the second connection path, and the third connection path is a path through Z2" can be used, for example. Alternatively, the expression "a source (or a first terminal or the like) of a transistor is electrically connected to X through Z1 by at least a first connection path, the first connection path does not include a second connection path, the second connection path includes a connection path through the transistor, a drain (or a second terminal or the like) of the transistor is electrically connected to Y through Z2 by at least a third connection path, and the third connection path does not include the second connection path" can be used. Alternatively, the expression "a source (or a first terminal or the like) of a transistor is electrically connected to X by at least a first electrical path through Z1, the first electrical path does not include a second electrical path, the second electrical path is an electrical path from the source (or the first terminal or the like) of the transistor to a drain (or a second terminal or the like) of the transistor, the drain (or the second terminal or the like) of the transistor is electrically connected to Y by at least a third electrical path through Z2, the third electrical path does not include a fourth electrical path, and the fourth electrical path is an electrical path from the drain (or the second terminal or the like) of the transistor to the source (or the first terminal or the like) of the transistor" can be used. When the connection path in a circuit structure is defined by an expression similar to the above examples, a source (or a first terminal or the like) and a drain (or a second terminal or the like) of a transistor can be distinguished from each other to specify the technical scope.

Note that these expressions are examples and the expression is not limited to these expressions. Here, X, Y, Z1, and Z2 denote an object (e.g., a device, an element, a circuit, a wiring, an electrode, a terminal, a conductive film, or a layer).

Even when independent components are electrically connected to each other in a circuit diagram, one component has functions of a plurality of components in some cases. For example, when part of a wiring also functions as an electrode, one conductive film has functions of both components: a function of the wiring and a function of the electrode. Thus, electrical connection in this specification includes, in its category, such a case where one conductive film has functions of a plurality of components.

REFERENCE NUMERALS

AF1: alignment film, AF2: alignment film, C11: capacitor, C12: capacitor, CI: control data, CSCOM: conductive film, DC: sensing circuit, DS: sensing data, FPC1: flexible printed circuit, G1: scan line, G2: scan line, GCLK: signal, II: input data, IS: image signal, KB1: structure body, N1: node, PWC1: signal, PWC2: signal, S1: signal line, S2: signal line, SP: control signal, SW11: switch, SW12: switch, V11: data, VCOM1: conductive film, VI: image data, VPI: conductive film, VR: conductive film, WX: conductive film, 200: data processing device, 210: arithmetic device, 211: arithmetic portion, 212: memory portion, 213: artificial intelligence portion, 214: transmission path, 215: input/output interface, 220: input/output device, 230: display portion, 231: display region, 233: control circuit, 234: decompression circuit, 235: image processing circuit, 238: control portion, 240: input portion, 241: sensing region, 250: sensing portion, 290: communication portion, 404: conductive film, 406: insulating film, 408: semiconductor film, 408A: region, 408B: region, 408C: region, 412A: conductive film, 412B: conductive film, 420: functional layer, 424: conductive film, 430: sensing circuit, 451: electrode, 452: electrode, 453: semiconductor film, 470: lens, 491A: opening portion, 501C: insulating film, 504: conductive film, 506: insulating film, 508: semiconductor film, 508A: region, 508B: region, 508C: region, 510: base material, 512A: conductive film, 512B: conductive film, 516: insulating film, 518: insulating film, 519B: terminal, 520: functional layer, 521: insulating film, 521B: insulating film, 524: conductive film, 530: pixel circuit, 591A: opening portion, 700: display panel, 702: pixel, 705: sealant, 720: functional layer, 750: liquid crystal element, 751: electrode, 752: electrode, 753: layer, 754: conductive film, 770: base material, 770P: functional film, 771: insulating film, 800: functional panel, 802: sensor, 5200B: data processing device, 5210: arithmetic device, 5220: input/output device, 5230: display portion, 5240: input portion, 5250: sensing portion, 5290: communication portion

The invention claimed is:

1. An input/output device comprising:
a display portion; and
an input portion,
wherein the display portion comprises a display region,
wherein the display region comprises a pixel,
wherein the pixel comprises a pixel circuit and a liquid crystal element,
wherein the liquid crystal element comprises a first electrode, a second electrode, a layer comprising a liquid crystal material, a first alignment film, and a second alignment film,
wherein the first alignment film comprises a region positioned between the first electrode and the layer comprising a liquid crystal material,
wherein the second alignment film comprises a region positioned between the second electrode and the layer comprising a liquid crystal material,
wherein the second electrode is provided such that an electric field is applied to the layer comprising a liquid crystal material between the first electrode and the second electrode,
wherein the layer comprising a liquid crystal material scatters incident light with first scattering intensity when the electric field is in a first state,
wherein the layer comprising a liquid crystal material scatters the incident light with second scattering intensity when the electric field is in a second state, which is higher than the electric field in the first state,
wherein the second scattering intensity is 10 or more times as high as the first scattering intensity,
wherein the layer comprising a liquid crystal material comprises a liquid crystal material and a polymer material,
wherein the layer comprising a liquid crystal material is stabilized by the polymer material,
wherein the polymer material is a copolymer of a polyfunctional monomer and a monofunctional monomer,
wherein the input portion comprises a sensing region,
wherein the input portion senses an object approaching the sensing region,
wherein the sensing region comprises a region overlapping with the pixel, and
wherein the sensing region comprises a sensor.

2. The input/output device according to claim 1,
wherein the sensor comprises a photoelectric conversion element, and
wherein the photoelectric conversion element senses light entering through the pixel.

3. The input/output device according to claim 1,
wherein the pixel circuit is electrically connected to the liquid crystal element,
wherein the pixel circuit comprises a first switch, a second switch, a first capacitor, a second capacitor, a node, and a conductive film,
wherein the first switch comprises a first terminal supplied with a first signal,
wherein the first switch comprises a second terminal electrically connected to the node,
wherein the first capacitor comprises a first electrode electrically connected to the node,
wherein the first capacitor comprises a second electrode electrically connected to the conductive film, wherein the second switch comprises a first terminal supplied with a second signal,
wherein the second switch comprises a second terminal electrically connected to a first electrode of the second capacitor, and
wherein the second capacitor comprises a second electrode electrically connected to the node.

4. The input/output device according to claim 1,
wherein the display region comprises a group of pixels, a different group of pixels, a first scan line, a second scan line, a first signal line, and a second signal line,
wherein the group of pixels are arranged in a row direction,
wherein the group of pixels comprise the pixel,
wherein the different group of pixels are arranged in a column direction intersecting the row direction,
wherein the different group of pixels comprise the pixel,
wherein the first scan line is electrically connected to the group of pixels,
wherein the second scan line is electrically connected to the group of pixels,
wherein the first signal line is electrically connected to the different group of pixels, and
wherein the second signal line is electrically connected to the different group of pixels.

5. The input/output device according to claim 1,
wherein the display portion comprises a control portion and a display panel,
wherein the control portion is supplied with image data and control data,
wherein the control portion generates data on the basis of the image data,
wherein the control portion generates a control signal on the basis of the control data,
wherein the control portion supplies the data and the control signal,
wherein the display panel comprises the display region and a driver circuit,
wherein the display panel is supplied with the data and the control signal,
wherein the driver circuit operates on the basis of the control signal, and
wherein the pixel performs display on the basis of the data.

6. A data processing device comprising the input/output device according to claim 1 and an arithmetic device,
wherein the input/output device supplies sensing data and input data,
wherein the input/output device comprises a sensing portion,
wherein the sensing portion generates the sensing data,
wherein the input portion generates the input data,
wherein the arithmetic device is supplied with the input data or the sensing data,
wherein the arithmetic device generates the control data and the image data on the basis of the input data or the sensing data, and
wherein the arithmetic device supplies the control data and the image data.

7. The data processing device according to claim 6,
wherein the arithmetic device comprises an artificial intelligence portion,
wherein the artificial intelligence portion is supplied with the input data or the sensing data, and
wherein the artificial intelligence portion infers the control data on the basis of the input data or the sensing data.

8. A data processing device comprising one or more of a keyboard, a hardware button, a pointing device, a touch sensor, an illuminance sensor, an imaging device, an audio input device, an eye-gaze input device, and an attitude detection device, and the input/output device according to claim 1.

* * * * *